US011720834B2

(12) United States Patent
Lazarus et al.

(10) Patent No.: US 11,720,834 B2
(45) Date of Patent: Aug. 8, 2023

(54) TALENT PLATFORM EXCHANGE AND RECRUITER MATCHING SYSTEM

(71) Applicant: Scout Exchange LLC, Boston, MA (US)

(72) Inventors: Kenneth Lazarus, Concord, MA (US); Igor M. Oliynyk, Somerville, MA (US); Robert Green, Boston, MA (US); Robert McDonald, Boston, MA (US); Johan Bilien, Belmont, MA (US); Paul Miller, Cambridge, MA (US); Tuan Nguyen, Wayland, MA (US)

(73) Assignee: Scout Exchange LLC, Boston, MA (US)

( * ) Notice: Subject to any disclaimer, the term of this patent is extended or adjusted under 35 U.S.C. 154(b) by 0 days.

(21) Appl. No.: 16/710,917

(22) Filed: Dec. 11, 2019

(65) Prior Publication Data
US 2020/0226532 A1 Jul. 16, 2020

Related U.S. Application Data

(60) Provisional application No. 62/778,171, filed on Dec. 11, 2018.

(51) Int. Cl.
*G06Q 10/0631* (2023.01)
*G06Q 10/1053* (2023.01)

(52) U.S. Cl.
CPC . *G06Q 10/063112* (2013.01); *G06Q 10/1053* (2013.01)

(58) Field of Classification Search
CPC ............... G06Q 10/063112; G06Q 10/1053
See application file for complete search history.

(56) References Cited

U.S. PATENT DOCUMENTS 7,509,672 B1  3/2009  Horwitz et al.
7,783,541 B1  8/2010  Rolf
(Continued)

FOREIGN PATENT DOCUMENTS

CA  2 657 495 A1  9/2009
EP  3 163 525 A1  5/2017
(Continued)

OTHER PUBLICATIONS

Zwilling, 10 Questions for Selecting a Recruiter to Attract the Best Talent to Your Business Team, Sep. 11, 2011, https://.www.inc.com/martin-zwilling/how-to-find-best-hire-for-that-key-role-in-you-new-venture.html, p. 1-6.*

(Continued)

*Primary Examiner* — Mehmet Yesildag
*Assistant Examiner* — James Webb
(74) *Attorney, Agent, or Firm* — Wolf, Greenfield & Sacks, P.C.

(57) ABSTRACT

According to various aspects, systems and methods are provided for automatically matching recruiters to job openings. The system may train one or more models that determine a measure of compatibility between a recruiter and a job opening. The system may train the model(s) using stored records of activity tracked by the system. The measure of compatibility may be used to determine whether a recruiter is likely to place a candidate for a job opening. Some embodiments provide a system that can collect objective data about recruiters and hiring parties, and use the objective data to train the model(s).

34 Claims, 22 Drawing Sheets

(56) References Cited

U.S. PATENT DOCUMENTS

| | | |
|---|---|---|
| 8,103,679 B1 | 1/2012 | Cranfill et al. |
| 9,405,799 B1 | 8/2016 | Kapoor et al. |
| 10,147,072 B2 | 12/2018 | Chuang et al. |
| 10,664,775 B2 | 5/2020 | Chuang et al. |
| 11,321,645 B2 | 5/2022 | Chuang et al. |
| 11,410,131 B2 | 8/2022 | Chuang et al. |
| 2002/0010614 A1 | 1/2002 | Arrowood |
| 2003/0037032 A1 | 2/2003 | Neece et al. |
| 2004/0230452 A1 | 11/2004 | Abe et al. |
| 2004/0267595 A1 | 12/2004 | Woodings et al. |
| 2005/0267793 A1 | 12/2005 | Campbell et al. |
| 2007/0021982 A1 | 1/2007 | Sun |
| 2007/0033064 A1 | 2/2007 | Abrahamsohn |
| 2007/0094109 A1 | 4/2007 | Perry |
| 2007/0288308 A1 | 12/2007 | Chen et al. |
| 2008/0027783 A1 | 1/2008 | Hughes et al. |
| 2008/0059523 A1 | 3/2008 | Schmidt et al. |
| 2008/0065441 A1 | 3/2008 | Langmack et al. |
| 2009/0083235 A1 | 3/2009 | Joao |
| 2009/0089124 A1 | 4/2009 | Henderson et al. |
| 2009/0094239 A1 | 4/2009 | Sabol et al. |
| 2009/0125353 A1 | 5/2009 | Bullock et al. |
| 2009/0125443 A1 | 5/2009 | Lappin et al. |
| 2009/0177518 A1 | 7/2009 | Adams et al. |
| 2009/0216680 A1 | 8/2009 | McCown et al. |
| 2009/0287514 A1 | 11/2009 | West |
| 2009/0299829 A1 | 12/2009 | Fraser et al. |
| 2010/0030595 A1 | 2/2010 | Day |
| 2010/0169143 A1 | 7/2010 | Carr et al. |
| 2010/0185551 A1 | 7/2010 | Ganesh et al. |
| 2010/0211516 A1 | 8/2010 | Andrekovich et al. |
| 2011/0137816 A1 | 6/2011 | Kornblum et al. |
| 2011/0208664 A1 | 8/2011 | Rahman |
| 2011/0276506 A1 | 11/2011 | Schmitt |
| 2011/0276631 A1 | 11/2011 | Schmitt |
| 2012/0089432 A1 | 4/2012 | Podgumy et al. |
| 2012/0109837 A1 | 5/2012 | Sahagun et al. |
| 2012/0185402 A1 | 7/2012 | Lajoie |
| 2012/0215578 A1 | 8/2012 | Swierz, III et al. |
| 2012/0239585 A1 | 9/2012 | Bailey |
| 2013/0013443 A1 | 1/2013 | Christie |
| 2013/0036065 A1 | 2/2013 | Chen et al. |
| 2013/0036066 A1* | 2/2013 | Telahun |
| 2013/0046704 A1 | 2/2013 | Patwa et al. |
| 2013/0166465 A1 | 6/2013 | Barros et al. |
| 2013/0262175 A1 | 10/2013 | Deshpande et al. |
| 2013/0275193 A1 | 10/2013 | Chuang |
| 2013/0275321 A1* | 10/2013 | Chuang |
| 2013/0275322 A1 | 10/2013 | Chuang |
| 2013/0275323 A1 | 10/2013 | Chuang |
| 2013/0282605 A1 | 10/2013 | Noelting |
| 2014/0188768 A1* | 7/2014 | Bonissone |
| 2014/0207698 A1* | 7/2014 | Geisse ............... G06Q 10/1053 705/321 |
| 2014/0244333 A1 | 8/2014 | Boumas |
| 2014/0337242 A1 | 11/2014 | Bailey et al. |
| 2014/0358810 A1* | 12/2014 | Hardtke ............... G06Q 10/105 705/321 |
| 2015/0112765 A1 | 4/2015 | Sundaresh et al. |
| 2015/0242781 A1 | 8/2015 | Mancuso et al. |
| 2015/0317602 A1 | 11/2015 | Rao et al. |
| 2016/0027991 A1 | 1/2016 | Suzuki |
| 2016/0140528 A1 | 5/2016 | Shaaban et al. |
| 2016/0300190 A1 | 10/2016 | Moran |
| 2017/0024410 A1 | 1/2017 | Pola |
| 2017/0069036 A1 | 3/2017 | Shaaban et al. |
| 2017/0109834 A1 | 4/2017 | Shaaban et al. |
| 2017/0243152 A1 | 8/2017 | Thomson et al. |
| 2017/0357943 A1 | 12/2017 | Tiner et al. |
| 2017/0357945 A1* | 12/2017 | Ashkenazi |
| 2018/0232683 A1 | 8/2018 | Chuang et al. |
| 2018/0232684 A1 | 8/2018 | Chuang et al. |
| 2018/0232703 A1 | 8/2018 | Chuang et al. |
| 2019/0220748 A1* | 7/2019 | Denil |
| 2019/0244176 A1 | 8/2019 | Chuang et al. |
| 2020/0104800 A1 | 4/2020 | Oliynyk et al. |
| 2021/0103875 A1 | 4/2021 | Chuang et al. |

FOREIGN PATENT DOCUMENTS

| | | | |
|---|---|---|---|
| EP | 3 734 523 A1 | 11/2020 | |
| EP | 3734523 A1 * | 11/2020 | ..... G06Q 10/063112 |
| GB | 2558032 A * | 7/2018 | ......... G06Q 10/1053 |
| JP | 2002-024459 A | 1/2002 | |
| JP | 2002-288325 A | 10/2002 | |
| JP | 2004-192224 A | 7/2004 | |
| JP | 2005-222168 A | 8/2005 | |
| JP | 2005-275991 A | 10/2005 | |
| JP | 2006-185409 A | 7/2006 | |
| JP | 2009-075690 A | 4/2009 | |
| JP | 2011-517354 A | 6/2011 | |
| JP | 2015-501024 A | 1/2015 | |
| KR | 100571718 B1 | 4/2006 | |
| WO | WO 01/09772 A1 | 2/2001 | |
| WO | WO 02/46884 A2 | 6/2002 | |
| WO | WO 2006/132759 A2 | 12/2006 | |
| WO | WO 2008/121171 A1 | 10/2008 | |
| WO | WO 2009/108445 A | 9/2009 | |
| WO | WO 2013/052769 A1 | 4/2013 | |
| WO | WO-2013052769 A1 * | 4/2013 | ..... G06Q 10/063112 |
| WO | WO 2018/223235 A1 | 12/2018 | |

OTHER PUBLICATIONS

Brownlee, Difference Between Classification and Regression in Machine Learning, Dec. 11, 2017, https://web.archive.org/web/20180702024525/https://machinelearningmastery.com/classification-versus-regression-in-machine-learning/, p. 3.*

Extended European Search Report from corresponding European Application No. EP 12838881.6 dated Mar. 5, 2015.

Summons to Attend Oral Proceedings dated Aug. 2, 2019 in connection with European Application No. EP 12838881.6.

Invitation to Pay Additional Fees from corresponding International Application No. PCT/US2012/058904 mailed Dec. 6, 2012.

International Search Report and Written Opinion from corresponding International Application No. PCT/US2012/058904 dated Feb. 8, 2013.

International Preliminary Report on Patentability from corresponding International Application No. PCT/US2012/058904 dated Apr. 17, 2014.

International Search Report and Written Opinion dated Apr. 25, 2018 in connection with International Application No. PCT/US2018/018028.

Invitation to Pay Additional Fees mailed Dec. 3, 2019 in connection with International Application No. PCT/US2019/053626.

International Search Report and Written Opinion dated Jan. 31, 2020 in connection with International Application No. PCT/US2019/053626.

International Search Report and Written Opinion dated Mar. 4, 2020 in connection with International Application No. PCT/US2019/065674.

Collins, Best practices for avoiding duplicate candidate submissions to job orders by recmiters? Jul. 2007 [retrieved Jan. 23, 2013] retrieved from the Internet <URL: http://www.linkedin.com/answers/hiring-human-resources/staffing-recruiting/HRH_SFF/62429-1275612>.

Cullens, Fishing where the fish are. National Apartment Associate, Nov. 2006.

Singh et al., Prospect: A System for Screening Candidates for Recruitment. CIKM '10. Oct. 26-30, 2010:659-668.

U.S. Appl. No. 13/645,759, filed Oct. 5, 2012, Chuang.
U.S. Appl. No. 13/645,878, filed Oct. 5, 2012, Chuang.
U.S. Appl. No. 16/208,198, filed Dec. 3, 2018, Chuang et al.
U.S. Appl. No. 16/586,797, filed Sep. 27, 2019, Oliynyk et al.
EP 12838881.6, Mar. 5, 2015, Extended European Search Report.
EP 12838881.6, Aug. 2, 2019, Summons to Attend Oral Proceedings.
PCT/US2012/058904, Dec. 6, 2012, Invitation to Pay Additional Fees.

(56) References Cited

OTHER PUBLICATIONS

PCT/US2021/058904, Feb. 8, 2013, International Search Report and Written Opinion.
PCT/US2012/058904, Apr. 17, 2014, International Preliminary Report of Patentability.
PCT/US2018/018028, Apr. 25, 2018, International Search Report and Written Opinion.
PCT/US2019/053626, Dec. 3, 2019, Invitation to Pay Additional Fees.
PCT/US2019/053626, Jan. 31, 2020, International Search Report and Written Opinion.
PCT/US2019/065674, Mar. 4, 2020, International Search Report and Written Opinion.
Extended Euorpean Search Report dated Jul. 9, 2020 in connection with European Application No. 20159615.2.
European Communication dated Oct. 14, 2020 in connection with European Application No. 18707550.2.
International Preliminary Report on Patentability dated Apr. 8, 2021 in connection with International Application No. PCT/US2019/053626.
International Preliminary Report on Patentability dated Jun. 24, 2021 in connection with International Application No. PCT/US2019/065674.
Extended European Search Report dated Feb. 8, 2022 in connection with European Application No. 19867864.1.
Wolf, Recruiting 101. T+D. Association for Talent Development. Apr. 2014;18.
Extended European Search Report dated Apr. 14, 2022, in connection with European Application No. 19896657.4.
European Examination Report dated Jan. 26, 2023, in connection with European Application No. 20159615.2.
Canadian Office Action dated Oct. 17, 2022, in connection with Canadian Application No. 3,126,565.
Australian Examination Report No. 2 dated Sep. 23, 2022, in connection with Australian Application No. 2018217898.

\* cited by examiner

FIG. 7

Listing Summary

Test1 188 Test | 4990 | Permanent
Sedona, AZ
Salary: $30,000 - $70,000 | Fee 35% | Open to Bid
Guarantee Period: 90 Days

[View/Edit Listing] [Pause Submissions] — 702

Posted Today

Candidates — 701

Sharon S. — 704
Fee: 31%
Recruiter: Boros Istvan ⊕
Recruiter's Job Category Rating: ★★★★☆  — 706
Recruiter's Overall Rating: ★★★☆☆
Scout Exchange: LLC ⓓ
Submitted 9:48AM on Aug 30, 2017

Pending
Expires in 14 days

Mihaela M.
Fee: 35%
Recruiter: Mihaela Nadasan ⊕  — 708
Recruiter's Job Category Rating: No Rating
Recruiter's Overall Rating: ★★★☆☆
Scout Exchange: LLC ⓓ
Submitted 10:37AM on Aug 30, 2017

Pending
Expires in 14 days

Mike Teevee
Fee: 34%
Recruiter: Corina Span ⊕
Recruiter's Job Category Rating: ★★★★☆
Recruiter's Overall Rating: ★★★☆☆

Interested

| | |
|---|---|
| ThinkTalent | Salary: $50,000-$55,000 |
| Facilitator | Fee: 15% \| Open to bid |
| San Diego, CA | Posted 8 days ago |
| Permanent \| Req ID: F-091117 | |
| Recruiter's Rating: ★★★★☆ —1402 | |
| | |
| ThinkTalent | Salary: $40,000-$60,000 |
| teP FUTURE DATA ANALYST PctFe | Fee: 10% \| Open to bid |
| Boston, Masschusetts | Start: Sep 8, 2017 |
| Permanent \| Req ID: CON001C8 | Posted 11 days ago |

*FIG. 14A*

*1410* scout connect | Scout Marketplace | My saved jobs [0] | My submit

< Job Details

Salesperson
Dallas, TX
Permanent | Req ID: SP-090717
Recruiter's Rating ★★★★☆ —1412
Job Category: Sales & Business Development Job Description    Job Stats job req ID: SP-090717

*FIG. 14B*

| Recruiter Profile | |
|---|---|
| Recruiter ID | |
| Job Category 1 | Acceptance Rate |
| | Hire Rate |
| | Recruiter Rating |
| Job Category 2 | Acceptance Rate |
| | Hire Rate |
| | Recruiter Rating |
| Placed Job 1 | Title |
| | Location |
| | Textual Description |
| | Employer |
| Placed Job 2 | Title |
| | Location |
| | Textual Description |
| | Employer |
| Employer 1 | Relationship Indicator |
| Employer 2 | Relationship Indicator |
| Net Acceptance Rate | |
| Net Hire Rate | |
| Average Response Time | |
| Recruiter Rating | |

*FIG. 16*

TALENT PLATFORM EXCHANGE AND RECRUITER MATCHING SYSTEM

RELATED APPLICATIONS

This application claims priority and the benefit under 35 U.S.C. 119(e) of U.S. Application Ser. No. 62/778,171, filed Dec. 11, 2018, entitled "TALENT PLATFORM EXCHANGE AND RECRUITER MATCHING SYSTEM", the entire contents of which are incorporated herein by reference in their entirety.

FIELD OF THE DISCLOSURE

The present disclosure relates to systems for recruiting and placing workers.

BACKGROUND

Hiring companies and search firm and/or staffing companies may utilize computer systems to manage candidates and applicants for open jobs. For example, a hiring company may utilize an applicant tracking system (ATS) to handle various recruitment activities. A staffing company may use a separate computer system (e.g., a separate ATS) to manage candidates and recruitment activities. A computer system used by a hiring firm or staffing firm may be referred to as a "talent platform."

SUMMARY OF THE DISCLOSURE

According to various aspects, systems and methods are provided for tracking actions performed by staffing and hiring parties (e.g., individual recruiters, etc.) for placement of candidates in computer systems used by the parties, and generating ratings for the parties based on the tracked actions. Some embodiments provide objective ratings of hiring and staffing parties that are automatically determined based on stored data records of tracked actions. The hiring and staffing party ratings may build transparency of activity performed by the parties within the disparate talent platforms. This in turn builds trust among users of the online system. For example, reliable ratings in a talent platform exchange system may give parties who use the platform exchange system trust in using the system. The ratings may also encourage trustworthiness with other users and proper behavior within the system. The ratings may also provide expectations to different parties with respect to performance. For example, a staffing party recruiter may gain an intuition of how responsive a particular hiring party recruiter is based on a rating associated with the hiring party recruiter. In another example, a hiring party recruiter may gain an intuition of how likely a staffing party recruiter is to provide candidates who are well-qualified for job openings.

According to various aspects, systems and methods are provided for automatically matching recruiters to job openings. The system may train one or more models that determine a measure of compatibility between a recruiter (e.g., staffing party recruiter) and a job opening. The system may train the models using stored records of activity tracked by the system. The measure of compatibility may be used to determine whether a recruiter is likely to place a candidate for a job opening. For example, the measure of compatibility may be used to determine provide a recruiter score that indicates a likelihood of the recruiter placing a candidate for the job opening. Some embodiments provide a system that can collect objective data about recruiters and hiring parties, and use the objective data to train the model(s).

According to one aspect, an exchange system is provided. The system comprises a database, a first interface with a hiring talent platform associated with a hiring party, a second interface with a staffing talent platform associated with a staffing party, and at least one processor configured to receive, via the first interface, at least one job requisition from the hiring talent platform, receive, via the second interface, at least one candidate profile submission to the at least one job requisition from the staffing talent platform, track at least one action performed in the hiring talent platform with respect to the at least one candidate submission to the at least one job requisition at least in part by storing, in the database, a record of the at least one action, and determine ratings for the hiring party and the staffing party using the record of the at least one action.

According to one embodiment, at least one action includes accepting one or more of the at least one candidate submission. According to one embodiment, at least one action includes rejecting one or more of the at least one candidate submission. According to one embodiment, at least one processor is configured to store a time taken to perform the at least one action in the record of the at least one action. According to one embodiment, at least one processor is configured to calculate a score for the staffing party based on the record of the at least one action, and determine the rating for the staffing party based on the score. According to one embodiment, at least one processor is configured to normalize the score relative to an average score of a plurality of staffing parties. According to one embodiment, at least one processor is configured to generate at least one user interface within the hiring talent platform, and tracking the at least one action at least in part by detecting one or more selections within the at least one user interface. According to one embodiment, least one processor is configured to: determine at least one time taken to perform the at least one action within the hiring talent platform; and determine the rating for the hiring party based on the at least one time taken to perform the at least one action.

According to one aspect, an exchange system is provided. The system comprises a database, a first interface with a hiring talent platform associated with a hiring party, a second interface with a staffing talent platform associated with a staffing party, and at least one processor configured to receive, via the first interface, at least one job requisition from the hiring talent platform, receive, via the second interface, at least one candidate profile submission to the at least one job requisition from the staffing talent platform, and determine a match score for the job requisition and the staffing party using information from the at least one job requisition and information received from the at least one candidate profile submission from the staffing talent platform.

According to one embodiment, at least one processor is configured to use the match score to make recommendations to users. According to one embodiment, at least on processor is configured to determine the match score at least in part by using an augmented dataset. According to one embodiment, at least one processor is configured to store transaction data in the database, and determine the match score at least in part by using an augmented dataset including at least a portion of the stored transaction data. According to one embodiment, least one processor is configured to determine the match score at least in part by using an augmented dataset including additional datasets referenced in at least one of the job description and the candidate profile. According to one embodiment, at least one processor is configured to determine the match score at least in part by using an augmented dataset including candidate assessments.

According to one aspect, an exchange system is provided. The system comprises a database, a first interface with a hiring talent platform associated with a hiring party, a second interface with a staffing talent platform associated with a staffing party, and at least one processor configured to receive, via the first interface, at least one job requisition from the hiring talent platform, receive, via the second interface, at least one candidate profile submission to the at least one job requisition from the staffing talent platform, and determine a match score between the at least one job requisition and the at least one candidate profile submission using information from the at least one job requisition and information from the at least one candidate profile submission.

According to one embodiment, at least one processor is configured to use the match score to make recommendations to users. According to one embodiment, at least one processor is configured to determine the match score at least in part by using an augmented the dataset According to one embodiment, at least one processor is configured to store transaction data in the database, and determine the match score at least in part by using an augmented dataset including at least a portion of the stored transaction data. According to one embodiment, at least one processor is configured to determine the match score at least in part by using an augmented dataset including additional datasets referenced in the at least one job description and/or the at least one candidate submission. According to one embodiment, at least one processor is configured to determine the match score at least in part by using an augmented the dataset including candidate assessments.

According to another aspect, an exchange system is provided. The exchange system comprises: a database; at least one processor configured to: generate a first at least one user interface for at least one hiring party; receive, via the first at least one user interface, at least one job requisition; generate a second at least on user interface for at least one staffing party; receive, via the second at least one user interface, at least one candidate profile submission to the at least one job requisition; track at least one action performed in the first at least one user interface with respect to the at least one candidate submission to the at least one job requisition at least in part by storing, in the database, at least one record of the at least one action; and determine at least one rating for the at least one hiring party and/or at least one rating for the at least one staffing party using the at least one record of the at least one action.

According to one embodiment, the at least one action includes accepting one or more of the at least one candidate submission. According to one embodiment, the at least one action includes rejecting one or more of the at least one candidate submission. According to one embodiment, the at least one processor is configured to store a time taken to perform the at least one action in the at least one record of the at least one action. According to one embodiment, the at least one processor is configured to: calculate at least one score for the at least one staffing party based on the at least one record of the at least one action; and determine the rating for the at least one staffing party based on the at least one score. According to one embodiment, the at least one processor is configured to normalize the at least one score relative to an average score of a plurality of staffing parties.

According to one embodiment, the at least one processor is configured to: tracking the at least one action at least in part by detecting one or more selections within the first at least one first user interface. According to one embodiment, the at least one processor is configured to: determine at least one time taken to perform the at least one action within the first at least one user interface; and determine the at least one rating for the at least one hiring party based on the at least one time taken to perform the at least one action.

According to another aspect, a talent exchange system for placement of candidates to job openings is provided. The system comprises: a database; a processor configured to perform a method comprising: tracking activity of a plurality of recruiter users of the system, the activity comprising actions performed in the system by the plurality of recruiter users in placing candidates for job requisitions; storing, in the database, records of the activity of the plurality of recruiter users; training, using at least a portion of the records of the activity, at least one model, the at least one model configured to output a measure of compatibility between a recruiter user and a job requisition; matching a first recruiter user to a first job requisition at least in part by: determining, using the trained at least one model, a first measure of compatibility between the first recruiter user and the first job requisition; and determining to match the first recruiter user to the first job requisition based on the first measure of compatibility.

According to one embodiment, the method further comprises: storing a record of activity of the first recruiter user in the database; generating a profile of the first recruiter user based on the record of activity of the first recruiter user; and matching the first recruiter user to the first job requisition using the profile of the first recruiter user. According to one embodiment, matching the first recruiter user to the first job requisition using the profile of the first recruiter user comprises generating an input to the at least one model using information from the profile of the first recruiter user. According to one embodiment, generating the profile of the first recruiter user based on the record of activity of the first recruiter comprises: determining a value of a measure of performance for the first recruiter user in placing candidates for a job category; and storing the value of the measure of performance mapped to an identification of the job category in the profile.

According to one embodiment, the method further comprises: identifying one or more characteristics of one or more job requisitions that the first recruiter user has previously worked on; obtaining additional information using the identified one or more characteristics; and generating an input to the at least one model based on the obtained additional information. According to one embodiment, the one or more characteristics include identities of one or more employers that the first recruiter user has worked with, textual job descriptions of the one or more job requisitions, job skills specified in the one or more job requisitions, and/or employment categories of the one or more job requisitions. According to one embodiment, the method further comprises generating an input to the at least one model based on values of one or more measures of performance for the first recruiter user. According to one embodiment, the one or more measures of performance include a submission acceptance rate, hiring rate, response time, number of hires, time taken to hire for one or more job requisitions for which the first recruiter user has placed candidates, and/or experience level specified by the one or more job requisitions.

According to one embodiment, the method further comprises generating an input to the at least one model based on whether the first recruiter user has a prior relationship with a hiring party that submitted the first job requisition. According to one embodiment, the method further comprises matching the first recruiter user to the first job requisition based on an indication of how busy the first recruiter user is. According to one embodiment, the method further comprises determining the indication of how busy the first recruiter is based on a number of job requisitions, different from the first job requisition, that the first recruiter user is assigned to in the system.

According to one embodiment, the method further comprises matching the first recruiter user to the first job requisition based on a measure of urgency for finding a candidate for the first job requisition. According to one embodiment, the method further comprises determining a value of the measure of urgency based on a response time of a hiring party associated with the first job requisition. According to one embodiment, the method further comprises generating an input to the at least one model using information specified by the first job requisition. According to one embodiment, the information specified by the first job requisition includes an indication of a location, an employer name, an indication of salary, a placement fee, a job title, an indication of a level of responsibility, a number of employees that are to report to the position, a size of an employer, and/or representation of a textual job description.

According to one embodiment, the at least one model is configured to determine the measure of compatibility between the recruiter user and the job requisition based on performance of the first recruiter user in placing candidates for each of one or more job categories associated with the first job requisition. According to one embodiment, the at least one model comprises at least one first model configured to classify the job requisition into one or more job categories. According to one embodiment, the at least one model comprises at least one second model for determining the measure of compatibility based on the one or more job categories that the job requisition is classified into by the at least one first model. According to one embodiment, the method further comprises training the at least one first model based on the stored records of activity of the plurality of recruiter users. According to one embodiment, the at least one first model comprises a natural language processing model configured to process textual information in the job requisition. According to one embodiment, the natural language processing model comprises a transformer. According to one embodiment, the natural language processing model comprises a recursive neural network. According to one embodiment, the measure of compatibility comprises an indication of a probability that the first recruiter user will place a candidate for the first job requisition. According to one embodiment, the at least one model comprises a recursive neural network.

According to another aspect a computer-implemented method is provided. The method comprises: tracking activity of a plurality of recruiter users of a talent exchange system, the activity comprising actions performed in the talent exchange system by the plurality of recruiter users in placing candidates for job requisitions; storing, in a database, records of the activity of the plurality of recruiter users; training, using at least a portion of the records of the activity, at least one model, the at least one model configured to output a measure of compatibility between a recruiter user and a job requisition; matching a first recruiter user of the talent exchange system to a first job requisition at least in part by: determining, using the trained at least one model, a first measure of compatibility between the first recruiter user and the first job requisition; and determining to match the first recruiter to the first job requisition based on the first measure of compatibility.

According to one embodiment, the method further comprises: storing a record of activity of the first recruiter user in the database; generating a profile of the first recruiter user based on the record of activity of the first recruiter user; and matching the first recruiter user to the first job requisition using the profile of the first recruiter user. According to one embodiment, matching the first recruiter user to the first job requisition using the profile of the first recruiter user comprises generating an input to the at least one model using information from the profile of the first recruiter user. According to one embodiment, generating the profile of the first recruiter user based on the record of activity of the first recruiter comprises: determining a value of a measure of performance for the first recruiter user in placing candidates for a job category; and storing the value of the measure of performance mapped to an identification of the job category in the profile.

According to one embodiment, the method further comprises: identifying one or more characteristics of one or more job requisitions that the first recruiter user has previously worked on; obtaining additional information using the identified one or more characteristics; and generating an input to the at least one model based on the obtained additional information. According to one embodiment, the one or more characteristics include identities of one or more employers that the first recruiter user has worked with, textual job descriptions of the one or more job requisitions, job skills specified in the one or more job requisitions, and/or employment categories of the one or more job requisitions.

According to one embodiment, the method further comprises generating an input to the at least one model based on values of one or more measures of performance for the first recruiter user. According to one embodiment, the one or more measures of performance include a submission acceptance rate, hiring rate, response time, number of hires, time taken to hire for one or more job requisitions for which the first recruiter user has placed candidates, and/or experience level specified by the one or more job requisitions.

According to one embodiment, the method further comprises generating an input to the at least one model based on whether the first recruiter user has a prior relationship with a hiring party that submitted the first job requisition. According to one embodiment, the method further comprises matching the first recruiter user to the first job requisition based on an indication of how busy the first recruiter user is. According to one embodiment, the method further comprises determining the indication of how busy the first recruiter is based on a number of job requisitions, different from the first job requisition, that the first recruiter user is assigned to in the system. According to one embodiment, the method further comprises matching the first recruiter user to the first job requisition based on a measure of urgency for finding a candidate for the first job requisition. According to one embodiment, the method further comprises determining a value of the measure of urgency based on a response time of a hiring party associated with the first job requisition.

According to one embodiment, the method further comprises generating an input to the at least one model using information specified by the first job requisition. According to one embodiment, the information specified by the first job requisition includes an indication of a location, an employer name, an indication of salary, a placement fee, a job title, an indication of a level of responsibility, a number of employees that are to report to the position, a size of an employer, and/or representation of a textual job description. According to one embodiment, the at least one model is configured to determine the measure of compatibility between the recruiter user and the job requisition based on performance of the first recruiter user in placing candidates for each of one or more job categories associated with the first job requisition.

According to one embodiment, the at least one model comprises at least one first model configured to classify the job requisition into one or more job categories. According to one embodiment, the at least one model comprises at least one second model for determining the measure of compatibility based on the one or more job categories that the job requisition is classified into by the at least one first model. According to one embodiment, the method further comprises training the at least one first model based on the stored records of activity of the plurality of recruiter users. According to one embodiment, the at least one first model comprises a natural language processing model configured to process textual information in the job requisition. According to one embodiment, the natural language processing model comprises a transformer. According to one embodiment, the natural language processing model comprises a recursive neural network. According to one embodiment, the measure of compatibility comprises an indication of a probability that the first recruiter user will place a candidate for the first job requisition. According to one embodiment, the at least one model comprises a recursive neural network.

According to another aspect, a non-transitory computer-readable storage medium storing instructions is provided. The instructions, when executed by a processor, cause the processor to perform: tracking activity of a plurality of recruiter users of a talent exchange system, the activity comprising actions performed in the talent exchange system by the plurality of recruiter users in placing candidates for job requisitions; storing, in a database, records of the activity of the plurality of recruiter users; training, using at least a portion of the records of the activity, at least one model, the at least one model configured to output a measure of compatibility between a recruiter user and a job requisition; matching a first recruiter user of the talent exchange system to a first job requisition at least in part by: determining, using the trained at least one model, a first measure of compatibility between the first recruiter user and the first job requisition; and determining to match the first recruiter to the first job requisition based on the first measure of compatibility.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 7 shows an example of a user interface screen in a talent platform that provides an indication of candidate submissions to a job requisition, according to an aspect of the present application.

FIG. 8 shows an example of a user interface screen in a talent platform for taking an action for a candidate submission, according to an aspect of the present application.

FIG. 11 shows an example of a user interface screen in a talent platform displaying candidates submitted to a job requisition, according to an aspect of the present application.

FIG. 12 shows an example of a user interface screen in a talent platform displaying information about a candidate, according to an aspect of the present application.

FIGS. 14A-B show examples of user interface screens in a talent platform displaying a rating for a hiring party, according to an aspect of the present application.

FIG. 16 shows an example data structure used for storing a recruiter profile, according to an aspect of the present application.

DETAILED DESCRIPTION

Figure 1:
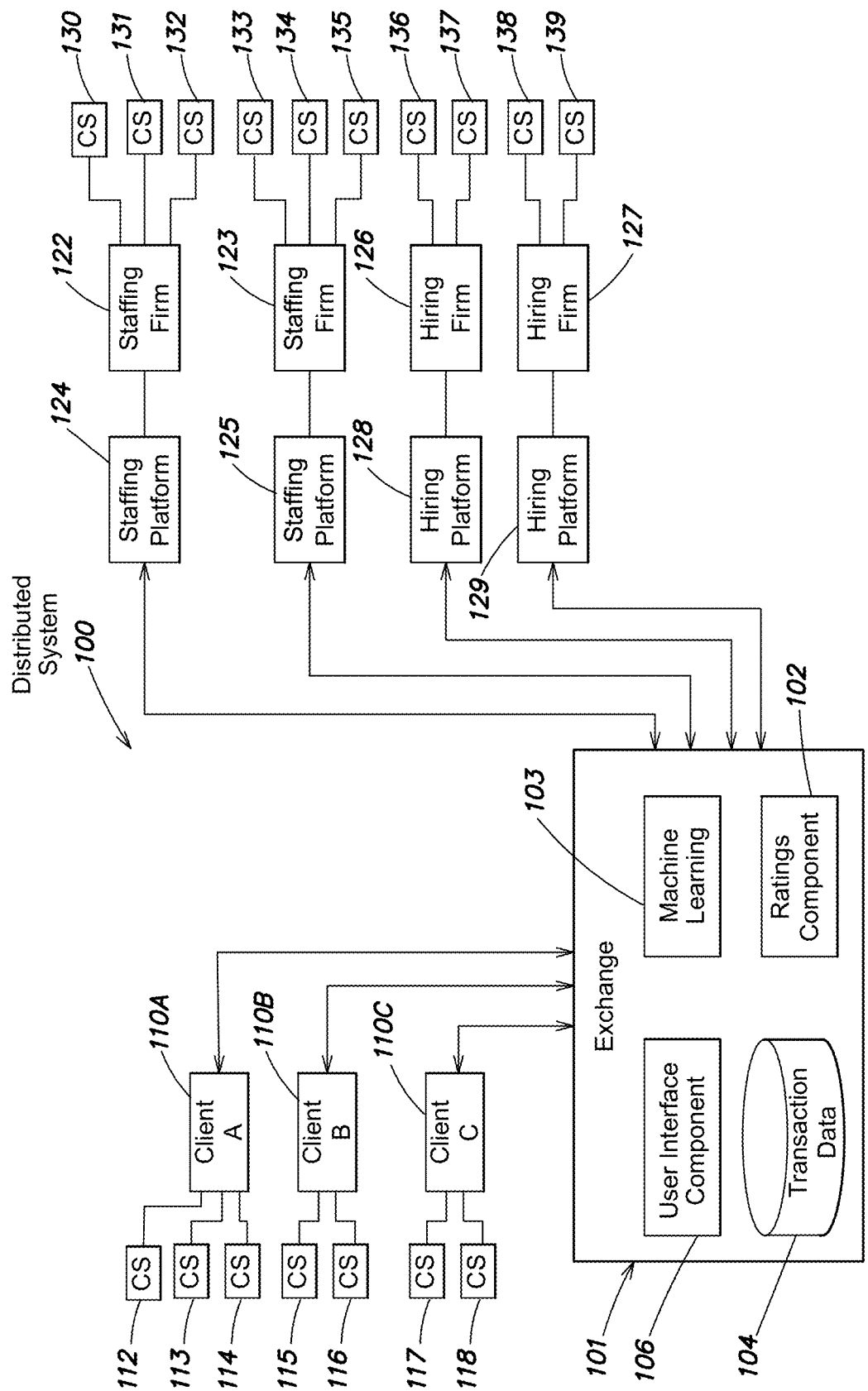
FIG. 1 shows a block diagram of a distributed computer system capable of implementing various aspects of the present application.

The inventors have recognized that disparate talent platform systems used by hiring parties (e.g., employers, recruiters of the employers, etc.) and staffing parties (e.g., staffing firms, staffing firm recruiters, and/or recruiting firms, etc.) do not provide indications of performances of the hiring parties and/or staffing parties with respect to candidate placement. For example, a staffing party using a first talent platform does not have an indication of how responsive hiring parties are to candidate submissions to job requisitions in talent platforms used by the hiring parties. In another example, a hiring party using a second talent platform does not have an indication within the second talent platform of performance of staffing parties in terms of providing well-qualified candidates for job opening.

The inventors have also recognized that conventional talent platforms (e.g., ATS systems) are unable to track or aggregate a data record of various actions performed by parties within separate talent platforms. A staffing party may submit candidates to job requisitions in multiple different employer talent platforms. Conventional systems are unable to track actions by respective employers in the different employer talent platforms. For example, the disparate talent platforms are unable to track and store a record of whether each of the employers accepted or rejected a candidate, whether a human resources or hiring manager viewed the candidate's information, or whether the candidate made it through screening, interview, or final stages, from within their respective talent platforms.

The inventors have developed systems and techniques for tracking actions performed by hiring and staffing parties in placing a candidate to a job requisition, and using a record of the tracked actions to determine ratings for staffing parties (e.g., staffing recruiters) and hiring parties (e.g., hiring recruiters). In some embodiments, a rating for a staffing party may indicate a quality of candidates that the staffing party submits for job requisitions. For example, a higher rating may indicate that the staffing party is likely to submit candidates that meet requirements of a job requisition. A lower rating may indicate that the staffing party is unlikely to submit candidates that meet the requirements of the job requisition. In some embodiments, the rating for a hiring party may indicate a responsiveness of the hiring party. For example, a higher rating may indicate that the hiring party makes decisions with regard to a candidate submission in a shorter amount of time relative to a hiring party with a lower rating. Systems described herein may use the ratings and tracked actions to determine how likely a recruiter is to place a candidate for a job opening. For instance, in some aspects, a system may include one or more trained statistical classifiers configured to determine how likely a staffing recruiter will place a candidate for a particular job opening having particular job characteristics. For instance, the trained statistical classifier(s) may base the determination on tracked actions and/or ratings associated with the recruiter across various staffing and hiring platforms, as applicable. In some embodiments, the trained statistical classifiers may be configured to output a score indicating the likelihood of placement for the recruiter. On the hiring side, a trained statistical classifier may be configured to determine whether job requisitions submitted by a hiring recruiter receive successful placements. For instance, the classifier may be configured to determine whether the hiring recruiter is likely to provide appropriate (e.g., sufficient) description in the job requisition for staffing recruiters to provide quality candidates. Techniques are also described further herein for training such statistical classifiers, in accordance with various embodiments.

According to one aspect, an exchange system is provided that integrates multiple disparate talent platforms. The system may include interfaces to hiring talent platforms used by hiring parties and staffing talent platforms used by staffing parties. The system may receive job requisitions from the hiring talent platforms, and candidate submissions to the job requisitions from the staffing talent platforms. A job requisition may specify a job opening at a respective employer. The job requisition may specify information about the job such as desired qualifications, location, salary, job type, job category, and other information. The system may (1) track actions performed with respect to candidate submissions in the talent platforms, and (2) store records of the actions in a database of the system. For example, the system may track acceptances or rejections of candidates, and store data records of the acceptances or rejections in the database. In some embodiments, the system may be configured to generate user interfaces within the hiring and staffing talent platforms, and track actions by detecting actions performed within the user interfaces. The system may then use stored records of actions to determine ratings for different staffing parties and hiring parties.

FIG. 1 shows a block diagram of a distributed computer system 100 capable of implementing various aspects of the present invention. Distributed system 100 includes an exchange system 101 that integrates multiple different computer systems associated with different parties involved in candidate placement. The exchange system 101 is connected to a number of different staffing talent platforms (e.g., staffing platform 124, staffing platform 125, etc.), hiring talent platforms (e.g., hiring platform 128, hiring platform 129, etc.), and other client systems (e.g., client systems 110A-C, etc.). In some embodiments, a talent platform may comprise an applicant tracking system (ATS). For example, a talent platform may be the Taleo ATS provided by the Oracle Corporation, or the BrassRing ATS provided by IBM. The staffing platforms 124-125 may be operated by respective staffing firms 122-123, which in turn, may authorize one or more computer systems (e.g., computer systems 130-135) to access the staffing platforms 124-125. Similarly, hiring firms 126-127 may authorize one or more computer systems 136-139 to access the hiring platforms 128-129. Client systems 110A-C may be accessed by users of computer systems 112-118. The client systems 110A-C may authorize other users to access the exchange system 101. For example, one or more prospective job candidates may access the exchange system 101 via client systems 110A-C.

The exchange system 101 includes a ratings component 102 configured to determines ratings for hiring parties and staffing parties that use the different hiring and staffing talent platforms, or that access the exchange system directly. The party may be a staffing firm, an individual recruiter, a hiring firm (e.g., an employer), and/or individuals at a hiring firm (e.g., a hiring manager). In some embodiments, the ratings component 102 may be configured to determine ratings for staffing parties (e.g., staffing firms 124-125) and hiring parties (e.g., hiring firms 126-127) that access the exchange system via respective talent platforms. The exchange system 101 includes a database 104. The database 104 stores transaction data that may be used by the ratings component 102 to determine ratings. In some embodiments, the exchange system 101 may be configured to track actions performed by hiring and staffing firm users and store a record of the actions in the database 104. In some embodiments, the exchange system 101 may be configured to track actions performed in user interfaces of the exchange system 101 provided within the various talent platforms. For example, the exchange system 101 may be configured to track candidate submissions, acceptances or rejections of candidate submissions, and/or status updates of candidates in a hiring process. In some embodiments, the exchange system 101 may be configured to track and store metadata associated with actions. For example, the exchange system 101 may be configured to store a time at which an action was performed, and/or an amount of time taken to perform an action. In some embodiments, the exchange system 101 may be configured to store information about a context associated with an action. For example, the exchange system 101 may store a job category, employer, geographic location, job type, industry, and/or salary associated with an action (e.g., acceptance or rejection of a candidate submission).

The exchange system 101 includes a machine learning component 103 that uses the transaction data and other data stored in the database 103 to generate outputs. In some embodiments, the ratings component 102 may be configured to use the machine learning component 103 to determine ratings. For example, the ratings component 102 may use one or more trained machine learning models to classify a job. The ratings component 102 may then use the job classification to determine a rating for the party for various jobs. In some embodiments, the machine learning component 102 may be configured to use ratings determined by the ratings component 102 to perform various functions. For example, the machine learning component 102 may be configured to match a staffing firm to a hiring firm based on ratings determined by the ratings component 102. In another example, the machine learning component 102 may be configured to match a candidate to a staffing firm based on ratings determined by the ratings component 102. In yet another example, the machine learning component 102 may be configured to match a candidate to a job requisition.

In some embodiments, the machine learning component 103 may be configured to use the transaction data and other data stored in the database 103 to match staffing parties to job requisitions. The machine learning component 103 may be configured to train one or more models that indicate a measure of compatibility between a staffing party (e.g., a recruiter, or staffing firm) and a job requisition. The trained model(s) 103 may then be used by the exchange system 101 to match the recruiter to the job requisition. In some embodiments, the machine learning component 103 may be configured to use stored records of tracked activity of the staffing party in placement of candidates within the exchange system 101. The exchange system 101 may be configured to use the trained model(s) to determine a compatibility between a staffing party and job requisition. In some embodiments, the exchange system 101 may be configured to access a data profile stored for the staffing party to determine one or more inputs to the model(s). In some embodiments, the exchange system 101 may be configured to access information from a stored record for the job requisition to generate one or more inputs to the model(s). The model(s) may be configured to output the measure of compatibility (e.g., a match score, probability of recruiter placing a candidate for the job requisition) in response to receiving the input(s). The exchange system 101 may be configured to use the measure of compatibility to determine whether to match the staffing party to the job requisition. For example, the exchange system 101 may use the measure of compatibility to (1) determine whether to recommend the job requisition to the staffing party, and/or to (2) determine whether to recommend the staffing party to a hiring party that submitted the job requisition.

The exchange system 101 includes a user interface component 106 configured to generate user interfaces within user interfaces of systems that the exchange system 101 is connected to. In some embodiments, the user interface component 106 may be configured to generate one or more user interfaces within staffing talent platforms (e.g., staffing platforms 124-125) and hiring talent platforms (e.g., hiring platforms 128-129). Staffing firm users may use computer systems 130-135 to access the exchange system 101 via the user interfaces generated within the staffing talent platforms 124-125. Hiring firm users may use computer systems 136-139 to access the exchange system 101 via user interfaces generated within hiring talent platforms 128-129. Other users may use computer systems 112-118 to access the exchange system 101 from within user interfaces provided by the client systems 110A-C.

In some embodiments, the exchange system 101 may be configured to generate one or more user interfaces within the hiring platforms 128-129 that allow hiring firm users to submit job requisitions to the exchange system 101. The exchange system 101 may be configured to receive the job requisitions and store a record of the job requisitions within a data store of the exchange system 101. In some embodiments, the exchange system 101 may be configured to generate one or more user interfaces within the staffing talent platforms 124-125 that allow staffing firm users to submit candidates to the job requisitions received from the hiring talent platforms 128-129. In some embodiments, the exchange system 101 may be configured to generate user interfaces within the staffing talent platforms 124-125 that allow staffing firm users to manage candidates and submissions of candidates to job requisitions. For example, the user interface component 106 may generate one or more user interfaces via which staffing firm users may view submissions they have made to various job requisitions. In some embodiments, the exchange system 101 may be configured to generate user interfaces within hiring talent platforms 128-129 that allow hiring firm users to manage candidates and submissions of candidates to job requisitions. For example, the hiring firm users may be able to view submitted candidates to their respective job requisitions, accept candidates, reject candidates, and/or update a status of candidates in a hiring process.

In some embodiments, the user interface component 106 may be configured to generate one or more user interfaces within connected talent platforms that display one or more ratings determined by the ratings component 102. In some embodiments, the user interface component 106 may be configured to display, within a user interface generated by the exchange system 101, ratings for one or more parties that access the exchange system 101. For example, the user interface component 106 may be configured to display ratings for staffing firms 122-123. In another example, the user interface component 106 may be configured to display ratings for hiring firms 126-127. In some embodiments, the user interface component 106 may be configured to display ratings for staffing firms in a user interface generated by the user interface component 106 in hiring platforms. In some embodiments, the user interface component 106 may be configured to display ratings for hiring firms in a user interface generated by the user interface component 106 in staffing talent platforms.

In some embodiments, the exchange system 101 may include an interface to each of the computer systems with which it is connected. For example, the exchange system may include an interface within each of the staffing talent platforms 124-125, the hiring talent platforms 128-129, and the client systems 110A-C. In some embodiments, an interface with a respective computer system may comprise an application program interface (API). The API may provide an interface by which the exchange system 101 may interact with the respective computer system. The API may include software code, that when executed by the computer system, may allow the computer system to interact with the exchange system 101. For example, an API for each of staffing platforms 124-125 may include functions that allow a recruiter using the staffing platform to submit candidates to a database of candidates stored by the exchange system 101. Similarly, an API for one of hiring platforms 128-129 may include functions that allow users of the hiring platform to access information stored by the exchange system 101 (e.g., candidate records). In another example, the exchange system 101 may include an API to interact with other systems such as one of client computer systems 110A-C. The API may include software code that, when executed, allows the exchange system 101 to retrieve and/or receive data from the client computer system. Similarly, the API may include software code, that when executed, allows the exchange system 101 to transmit data to the client computer system.

In some embodiments, staffing parties and hiring parties may access the exchange system directly. In some embodiments, a hiring talent platform or hiring platform may be a user interface provided to hiring parties by the exchange system. In some embodiments, a staffing talent platform or staffing platform may be a user interface provided to staffing parties by the exchange system. The user interface component 106 may be configured to generate the user interfaces by which the hiring or staffing party users can access the exchange system 101 and perform actions in the exchange system 101. The exchange system 101 may be configured to provide a hiring interface for hiring parties and a separate staffing interface for staffing parties. User interfaces described herein may be implemented within talent platforms and outside of the talent platforms.

Figure 2:
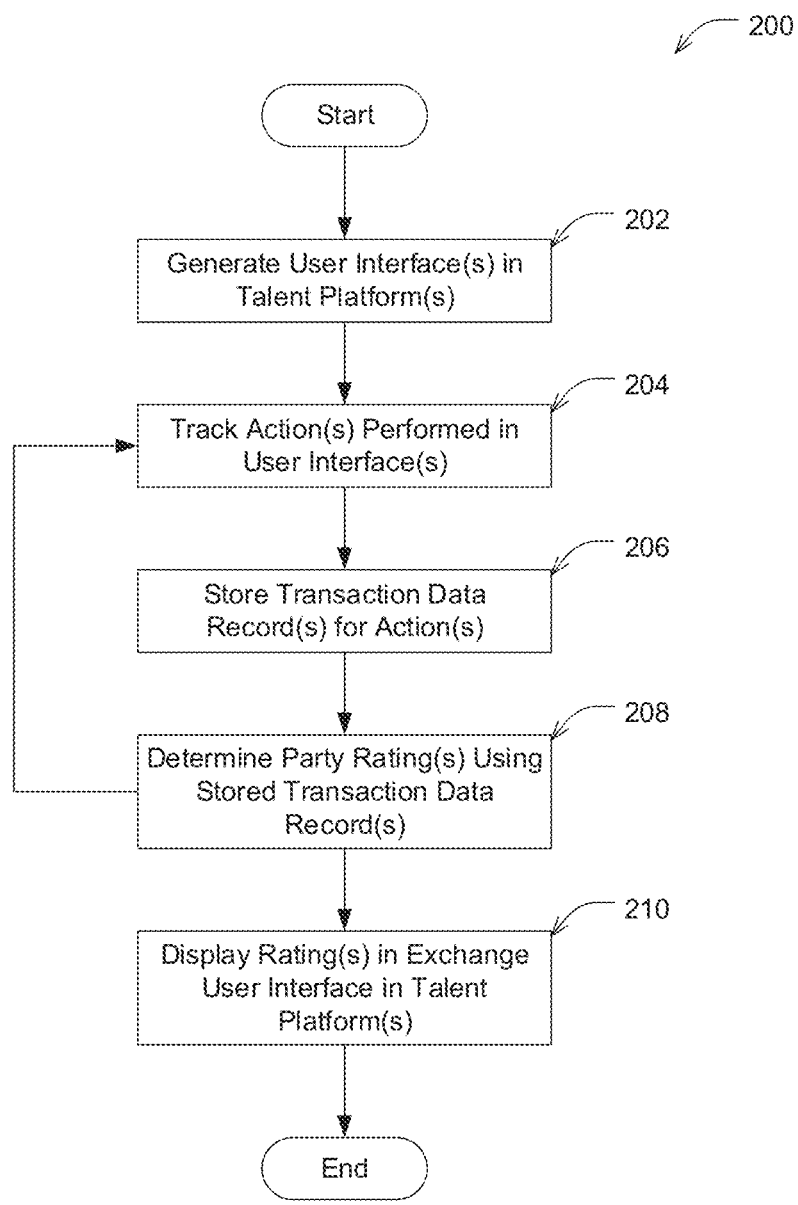
FIG. 2 shows a process for determining a rating for a party according to an aspect of the present application.

FIG. 2 shows a process 200 for determining a rating for a party according to an aspect of the present application. Process 200 may be performed by exchange system 101 described above with reference to FIG. 1.

Process 200 begins at block 202 where the exchange system generates one or more user interfaces within one or more talent platforms. In some embodiments, the system may be configured to generate a user interface within a hiring talent platform that allows a hiring party (e.g., an employer) to view candidates submitted by one or more staffing parties to one or more job requisitions associated with the hiring firm. The exchange system may receive candidate submissions from one or more staffing talent platforms used by the staffing parties. The user interface(s) may allow the hiring party to perform one or more actions with respect to a candidate submission. For example, the hiring party may be able to accept a candidate submitted by a staffing party for a job requisition. The user interface may provide an accept option which, when selected, causes the system to initiate a submitted candidate into an interview process for the job requisition. In another example, the hiring firm may be able to reject a candidate submitted by a staffing party for a job requisition. The user interface may provide a rejection option which, when selected, causes the system to remove the candidate from consideration for the job requisition.

Next, process 200 proceeds to block 204 where the exchange system tracks one or more actions performed in the user interface(s) generated in the talent platform(s). In some embodiments, the exchange system may be configured to track an action taken with respect to a candidate submission. For example, the exchange system may detect acceptance candidate submission via the user interface(s). In another example, the exchange system may detect rejection of a candidate submission via the user interface(s). In yet another example, the exchange system may track updates made via the user interface(s) throughout a hiring process. The updates may include a candidate progressing to various interview stages, and/or a candidate being officially hired. In some embodiments, the exchange system may generate user interfaces within the talent platform(s) that allow users of the talent platform to indicate a status of an accepted candidate in a hiring process. The exchange system may be configured to detect the status updates.

Next, process 200 proceeds to block 206 where the exchange system stores transaction data records associated with the action(s) tracked in the user interface(s) generated within the talent platform(s). In some embodiments, the exchange system may be configured to store a record of a particular action performed in a database (e.g., database 104) of the exchange system. For example, the exchange system may be configured to store a record of an acceptance of a candidate by a hiring party. In another example, the exchange system may be configured to store a record of a rejection of a candidate by a hiring party. In some embodiments, the exchange system may be configured to store the record in data profiles of one or more parties associated with the action. For example, the system may be configured to store a record of an acceptance or rejection in a profile associated with a staffing party from which the candidate submission was received. In another example, the system may be configured to store a record of an acceptance or rejection in a profile associated with a hiring party that accepted or rejected a candidate submitted to a job requisition associated with the hiring party.

In some embodiments, the exchange system may be configured to store metadata and/or contextual data associated with an action. In some embodiments, the exchange system may be configured to store a job category of a job requisition associated with the action. For example, if a staffing firm submitted a candidate to a job requisition, the exchange system may store a job category of the job requisition in a record of an acceptance or rejection of the candidate. In some embodiments, the exchange system may be configured to store a salary level, geographic location, amount of work experience, skills requirements, salary level, education level, and/or other information associated with the job requisition in a record of the action. In some embodiments, the exchange system may be configured to store a time at which an action was performed. For example, the exchange system may be configured to store a timestamp at which the exchange system detected performance of an action in a talent platform. In some embodiments, the exchange system may be configured to store an amount of time taken by a party to perform an action in a record associated with the action. For example, the exchange system may be configured to store an amount of time taken for a hiring party to accept or reject a submitted candidate. The exchange system may calculate the time as an amount of time that has passed since the exchange system transmitted an indication of the candidate submission to a hiring talent platform used by the hiring firm.

Next, process 200 proceeds to block 208 where the exchange system determines one or more ratings for one or more parties using the stored transaction records. In some embodiments, the exchange system may be configured to determine a rating for a party based on transaction records stored in a profile associated with the party maintained by the exchange system. For example, the exchange system may be configured to determine a rating for a respective staffing party based on records of rejections and/or acceptances of candidates submitted to job requisitions by the staffing party. The exchange system may be configured to use the records associated with the party to determine one or more ratings for the staffing firm. In another example, the exchange system may be configured to determine a rating for a respective hiring party based on records of actions stored in a profile associated with the hiring party maintained by the exchange system. The exchange system may be configured to use records associated with the hiring party to determine the rating.

In some embodiments, the exchange system may be configured to use one or more machine learning models to determine ratings for the parties. The exchange system may be configured to input transaction data into a machine learning model and determine ratings using a received output. The machine learning model may be a neural network, Bayesian classifier, support vector machine, or other type of machine learning model. The machine learning model may be trained on data and used to classify parties based on data collected about the parties.

Next, process 200 proceeds to block 210 where the exchange system displays the determined rating(s) for the parties in one or more user interfaces generated within the talent platform(s). In some embodiments, the exchange system may be configured to display ratings associated with staffing parties within one or more user interfaces generated within one or more hiring talent platforms. The ratings may provide hiring parties that use the hiring talent platform(s) an indication of how likely the staffing parties are to provide well-qualified candidates for job requisitions. In some embodiments, the exchange system may be configured to display ratings associated with hiring parties in one or more user interfaces generated within one or more staffing talent platforms. The ratings associated with the hiring parties may provide staffing parties that use the staffing talent platform(s) an indication of how responsive the hiring parties are, and/or how much feedback the hiring parties provide during a hiring process. In some embodiments, the exchange system may be configured to display a rating for a staffing party within a user interface of a staffing platform using by the staffing party. The rating may provide the staffing party an indication of the staffing party's performance. In some embodiments, the exchange system may be configured to display a rating for a hiring party within a user interface of a hiring platform used by the hiring party. The rating may provide the hiring party an indication of the hiring party's responsiveness to candidate submissions.

Figure 3:
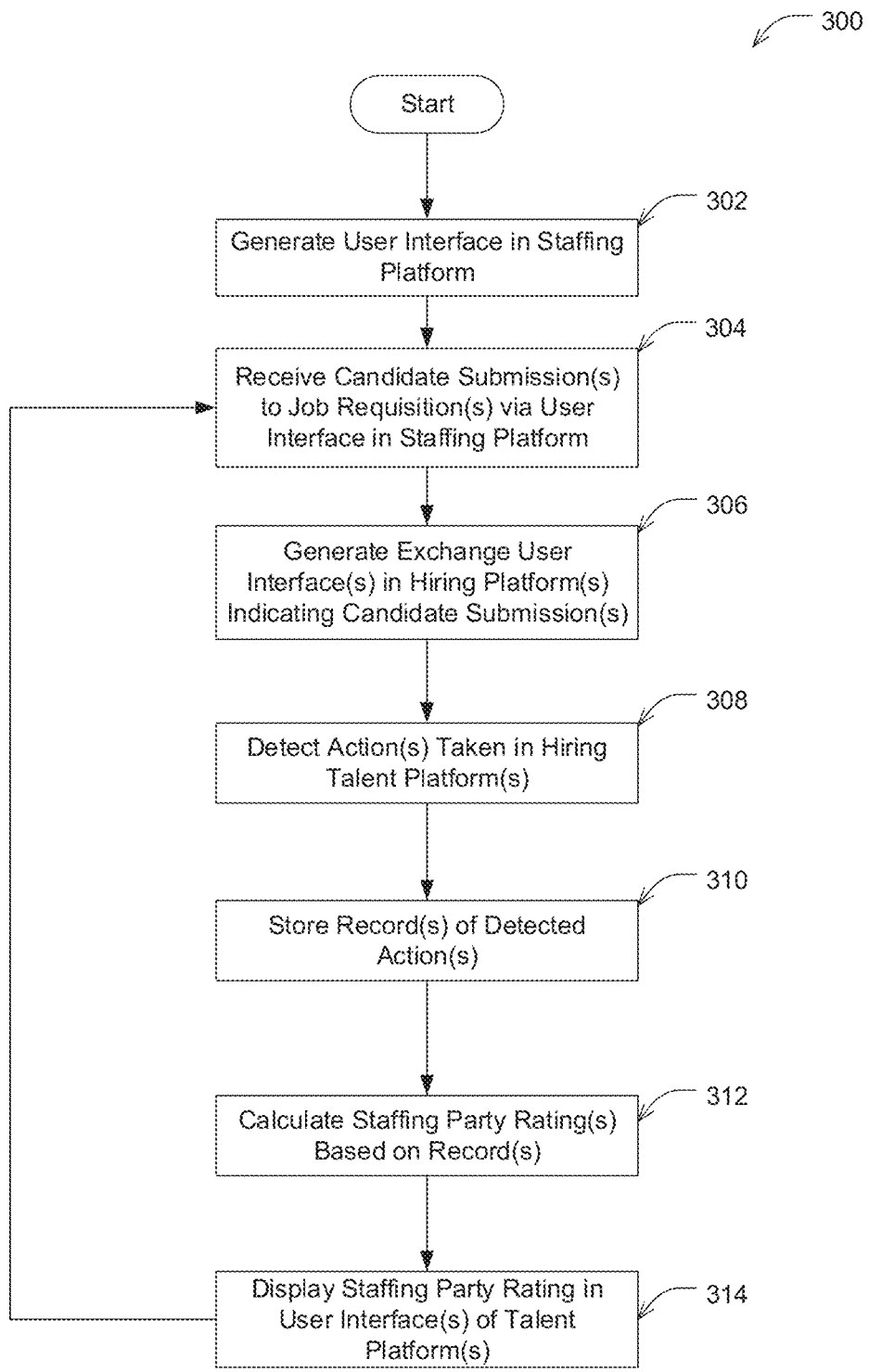
FIG. 3 shows a process for determining a rating for a staffing party according to an aspect of the present application.

FIG. 3 shows an example process 300 for determining a rating for a staffing party according to an aspect of the present application. Process 300 may be performed by exchange system 101 described above with reference to FIG. 1.

Process 300 begins at block 302 where the exchange system generates a user interface within a staffing talent platform used by the staffing party. The user interface may be configured to allow a user to submit one or more candidates to one or more job requisitions stored by the exchange system. The exchange system may have received the job requisition(s) from one or more hiring talent platforms.

Figure 5:
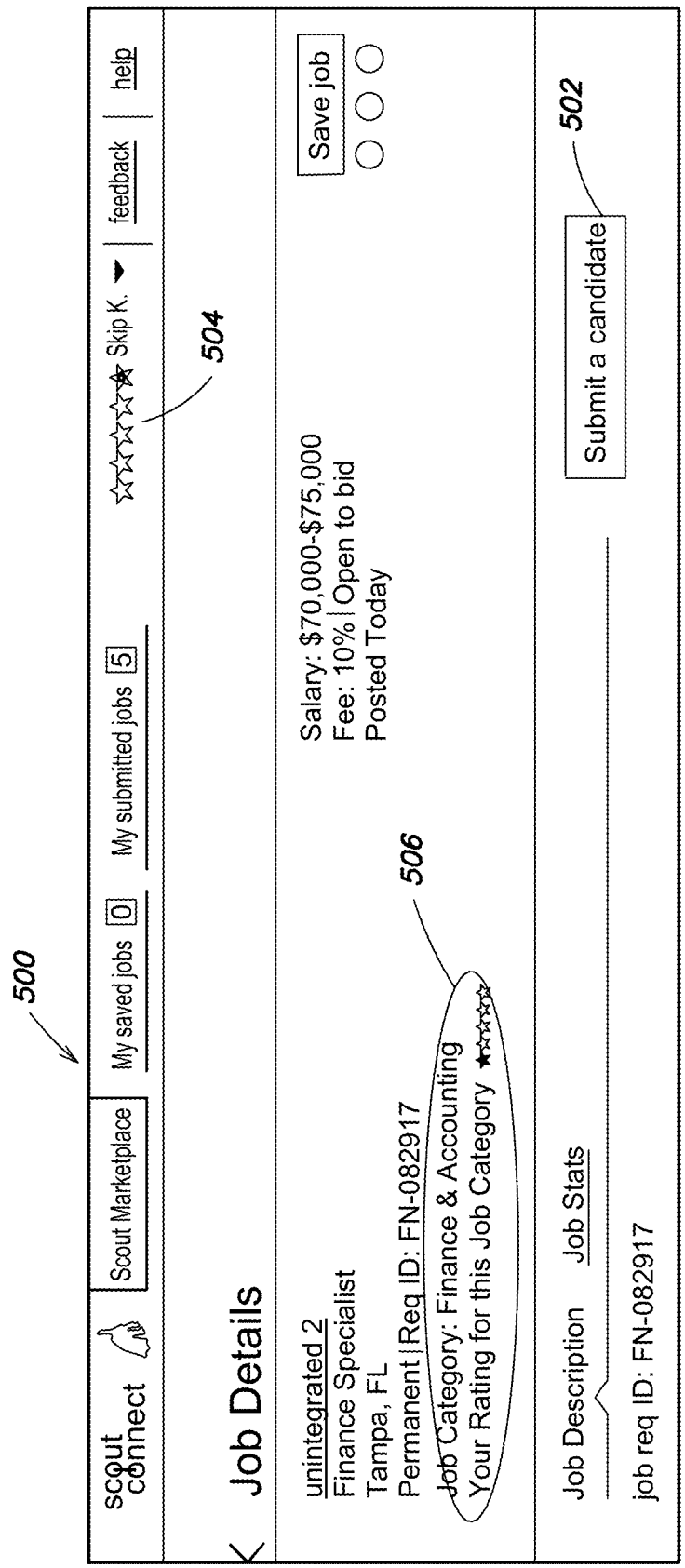
FIG. 5 shows an example of a user interface screen within a talent platform for submitting a candidate to a job requisition, according to an aspect of the present application.

FIG. 5 illustrates an example of a user interface screen 500 that may be generated by the exchange system within the staffing talent platform for a user of the staffing talent platform to submit a candidate to a job requisition. User interface screen 500 includes a selectable option 502 which a user of the staffing talent platform use to initiate submission of a candidate to a job requisition. In some embodiments, the exchange system may trigger a process of submitting a candidate to the job requisition in response to detecting a selection of the option 502 in user interface screen 500. User interface screen 500 further displays one or more current ratings associated with a user (e.g., a recruiter) of the staffing talent platform. The user interface screen 500 includes an overall rating 504 associated with the recruiter. The user interface screen 500 also includes a job category specific rating 506 of the recruiter for a job category associated with a respective job requisition.

Figure 6:
FIG. 6 shows an example of a user interface screen within a talent platform for providing information about a candidate for a submission to a job requisition, according to an aspect of the present application.

FIG. 6 illustrates an example of a user interface screen 600 that may be generated by the exchange system within the staffing talent platform for a user of the staffing talent platform to provide information about a candidate in order to submit the candidate to the job requisition. User interface screen 600 includes fields 602-610 in which the user can enter a first name, last name, email, and resume of the candidate. User interface screen 600 also includes a field 610 in which the user may specify a placement fee associated with hiring the candidate for the job requisition. In some embodiments, the user interface screen 600 may include one or more other fields in addition or instead of those shown in FIG. 6. Some embodiments are not limited to any particular fields described herein in the user interface screen.

After generating the user interface in the staffing talent platform, process 300 proceeds to block 304 where the exchange system receives one or more candidate submissions to one or more job requisitions via the user interface in the staffing talent platform. For example, a user of the staffing talent platform may submit the candidate via user interface screen 500 described above with reference to FIG. 5, and user interface screen 600 described above with reference to FIG. 6. In some embodiments, the exchange system may be configured to detect a selection in the user interface that initiates submission of the candidate. For example, the exchange system may detect a selection of a "submit candidate button" in the user interface that triggers retrieval of information about the candidate. In some embodiments, the exchange system may be configured to receive information about the candidate (e.g., via an API with the staffing talent platform). The exchange system may be configured to store a candidate record for the candidate in a database of the exchange system. For example, the exchange system may assign a unique identifier to the candidate in the memory, and store information about the candidate in a data profile of the candidate in the database.

Next, process 300 proceeds to block 306 where the exchange system generates one or more user interfaces within one or more hiring talent platforms that provide an indication of the candidate submission(s) to the job requisition(s). The hiring talent platform(s) may be talent platform(s) used by one or more hiring parties from which the exchange system received the job requisition(s). The user interface(s) may identify a staffing party (e.g., a recruiter, or recruiting firm) from which a respective candidate submission was received for the job requisition(s).

FIG. 7 illustrates an example user interface screen 700 generated by the exchange system within a hiring talent platform that provides indications of candidate submissions to a job requisition associated with a hiring firm that uses the hiring talent platform. User interface screen 700 provides a user of the hiring talent platform with information about one or more candidate submissions and options to select to trigger various actions associated with the job requisition. User interface screen 700 includes an option 701 that allows a user of the hiring talent platform to view or edit the job requisition. User interface screen 700 includes an option 702 for pausing submissions to the job requisition. In some embodiments, the exchange system may prevent candidate submissions to the job requisition in response to detecting selection of the option 702 for pausing submissions. The user interface screen 700 displays identification 704 of a staffing party (e.g., a recruiter) from whom the submission was received. The identification may be a name or username of a recruiter, a staffing firm, or other staffing party. The user interface screen 700 displays one or more ratings 706 associated with the staffing party from whom the submission was received. The rating(s) may include an overall rating for the staffing party and/or a job category specific rating for the staffing party for a particular job category associated with the job requisition. If a rating is not available, the user interface screen 700 indicates that a rating is not available. For example, as shown at reference 708 of FIG. 7, the user interface screen 700 may show "No Rating" if a current rating is not available for the staffing party.

Figure 8:
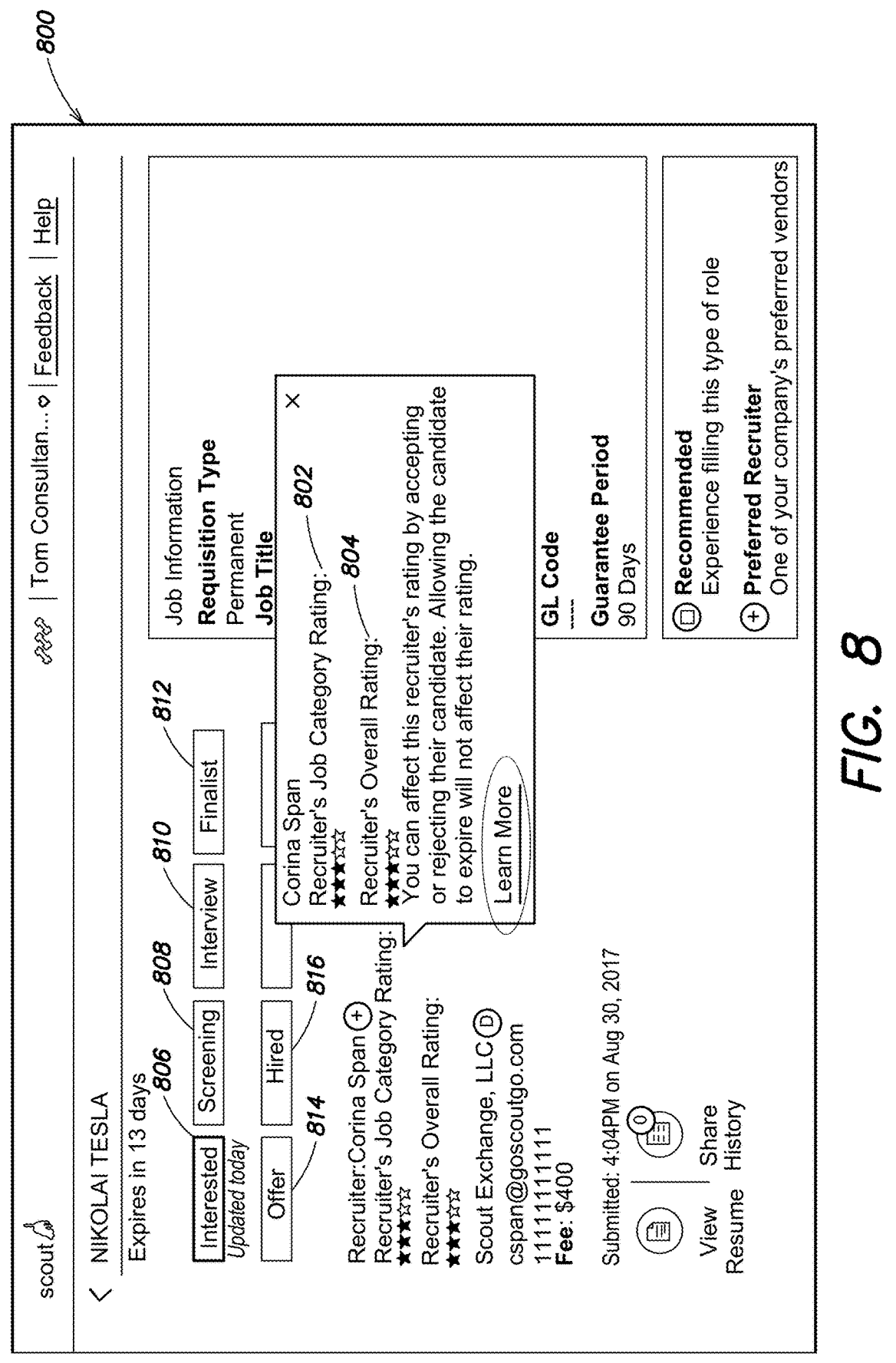

FIG. 8 illustrates a user interface screen 800 that may be generated by the exchange system within a hiring talent platform for a hiring party (e.g., a talent acquisition specialist, human resources manager or hiring manager) to take one or more actions with respect to a candidate submission. The user interface screen 800 may display information about a staffing party associated with the candidate submission. For example, as shown in FIG. 8, user interface screen 800 shows ratings 802-804 for the staffing party. The ratings include an overall rating 802 of the staffing party and a rating 804 specific to a job category associated with the job requisition. A hiring party may take various actions with respect to the candidate submissions. The user interface screen 800 provides an option 806 for indicating that the hiring party is interested in the candidate, an option 808 to indicate that the candidate is being screened, an option 810 to indicate that the candidate is being interviewed, an option 812 to indicate that the candidate is a finalist, an option 816 to indicate that an offer has been made to the candidate, and/or an option 816 indicating that the candidate has been hired. In some embodiments, the user interface screen 800 may provide an option for indicating that the hiring party is not interested in the candidate or rejects the candidate.

Next, process 300 proceeds to block 308 where the exchange system detects one or more actions performed in the hiring talent platform. In some embodiments, the exchange system may be configured to detect one or more actions performed in a user interface generated by the exchange system in the hiring talent platform(s). For example, the exchange may be configured to detect selection of the options 806-816 illustrated in FIG. 8 indicating actions of a hiring party with respect to a candidate submission. The detected selection may indicate a decision and/or status for the candidate submission. For example, the selection may indicate that a candidate has been accepted by the hiring party. In another example, the selection may indicate that a candidate has been rejected by the hiring party.

Next, process 300 proceeds to block 310 where the exchange system stores one or more records of the detected actions in the user interface(s) generated in the hiring talent platform. In some embodiments, the exchange system may be configured to store a data profile for a staffing party (e.g., a recruiter) that submitted a respective candidate. The exchange system may be configured to store record(s) of action(s) taken by one or more hiring parties within user interface(s) in the hiring talent platform(s) in the data profile. For example, the exchange system may be configured to store an indication that the candidate submission was accepted, rejected, that a hiring party is interested in the candidate, or other record of action as indicated by detected actions in the hiring talent platform(s). In some embodiments, the exchange system may be configured to store metadata and/or context data associated with the action with the record of the action. For example, the exchange system may store a time at which the action was taken (e.g., a timestamp). In another example, the exchange system may store information associated with the job requisition such as job category, salary, experience requirement, education requirement, or other information.

Next, process 300 proceeds to block 312 where the exchange system calculates a rating based on the stored record(s) of the detected action(s) taken with respect to the candidate submission(s). In some embodiments, the exchange system may be configured to calculate a rating between 1 and 5. In some embodiments, the exchange system may be configured to calculate a rating value between 1 and 10. In some embodiments, the rating may be on a continuous scale. In some embodiments, the exchange system may be configured to calculate discrete rating values (e.g., 1, 2, 3, 4, or 5).

In some embodiments, the exchange system may be configured to calculate the rating score based on how many candidate submissions from the staffing party are accepted by respective hiring parties. In some embodiments, an acceptance may be when a hiring party indicates interest in a candidate. In some embodiments, an acceptance may be when a hiring party has interviewed, made an offer to, or hired a candidate. In some embodiments, the exchanges system may be configured to normalize the rating across all staffing parties. To do so, the exchange system may be configured to determine an average probability of a candidate submission being accepted by a hiring party. The exchange system may determine the average probability as a ratio of a total number of detected acceptances to a total number of candidate submissions. The exchange system may then determine a ratio of acceptances to total candidate submissions of the hiring party. The exchange system may use the ratio for the hiring party and the average probability to obtain a normalized recruiter score. For example, the exchange system may divide the ratio of acceptances to candidate submissions of the candidate by the average probability of being accepted to determine how well the staffing party performs relative to all other staffing parties in the exchange system. In some embodiments, the exchange system may be configured to determine a rating value based on the recruiter score. For example, the exchange system may assign a rating based on the recruiter score as follows.

1=Recruiter Score<=0.25
2=0.25<Recruiter Score<=0.5
3=0.5<Recruiter Score<=1.125
4=1.125<Recruiter Score<=1.5
5=Recruiter Scor >1.5

Note, the above distribution of rating values based on recruiter score is exemplary. The ranges and associated rating values may be modified. Some embodiments are not limited to particular ranges and/or associated rating values. In some embodiments, the exchange system may be configured to periodically update the ranges and associated rating values.

In some embodiments, the exchange system is configured to calculate a ratio of acceptances to total submissions for a hiring party within a period of time. For example, the exchange system may determine the ratio over the last 90 days. In some embodiments, if the exchange system does not have a record of any candidate submissions for a length of time, the exchange system may not calculate a rating. For example, the exchange system may determine that the staffing party has not had a threshold level of activity for determining a rating value that indicates a performance of the staffing party to other parties. In some embodiments, the exchange system may be configured to calculate the average ratio of acceptance over a certain period of time. For example, the exchange system may be configured to calculate the average ratio of acceptance for all staffing parties in the system over the last 90 days.

In some embodiments, the exchange system may be configured to determine a rating for the staffing party for one or more job categories. For example, the exchange system may be configured to determine a rating for the staffing party based on acceptances of candidate submissions for the one or more job categories. The exchange system may be configured to compare an acceptance ratio of the hiring party for the job category to an average probability of acceptance for all staffing parties in the exchange system. The exchange system may be configured determine the job category specific rating value(s) based on the comparison.

In some embodiments, the exchange system may be configured to calculate a rating for the hiring party if the hiring party has met a threshold of activity. The threshold of activity may be a certain number of candidate submissions within a particular time period. For example, the exchange system may calculate a rating for the hiring party if the hiring party has at least 10 candidate submissions within the past 90 days. In some embodiments, the exchange system may be configured to not calculate a rating for the hiring party if the threshold of activity is not met by the hiring party.

After determining the rating(s) for the staffing party, process 300 proceeds to block 314 where the exchange system displays the rating(s) in one or more user interfaces generated within one or more talent platforms. As illustrated in user interface screen 500 discussed above with reference to FIG. 5, the exchange system may display ratings 504-506 in a user interface used by a hiring party in a hiring talent platform. As illustrated in user interface screen 700 discussed above with reference to FIG. 7, the exchange system may display the ratings 706 in a user interface of a hiring talent platform. As illustrated in user interface screen 800 discussed above with reference to FIG. 8, the exchange system may display ratings 802-804 associated with the staffing party within a user interface screen in which a hiring party may take actions with respect to a candidate submission from the staffing party.

Figure 9A:
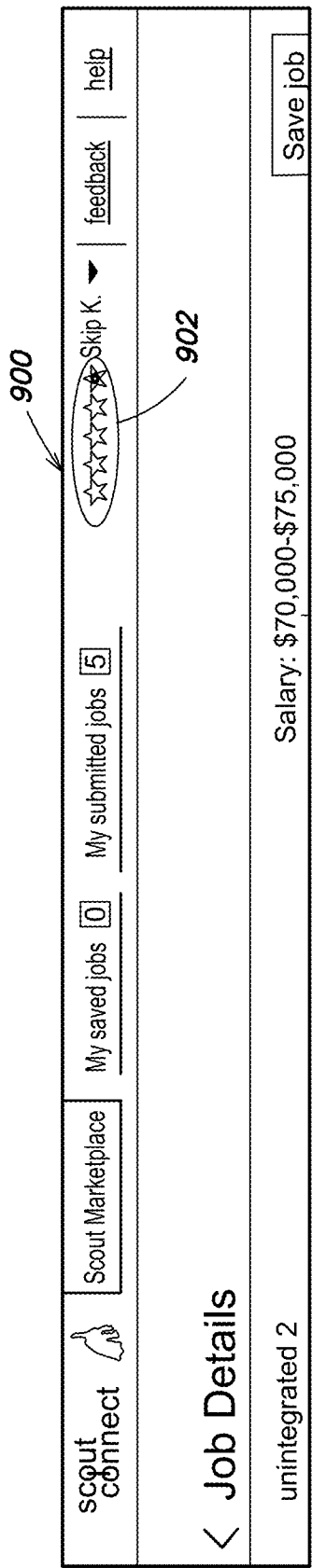
FIGS. 9A-B shows examples of user interface screens in a talent platform showing rating(s) of a staffing party, according to an aspect of the present application.
Figure 9B:
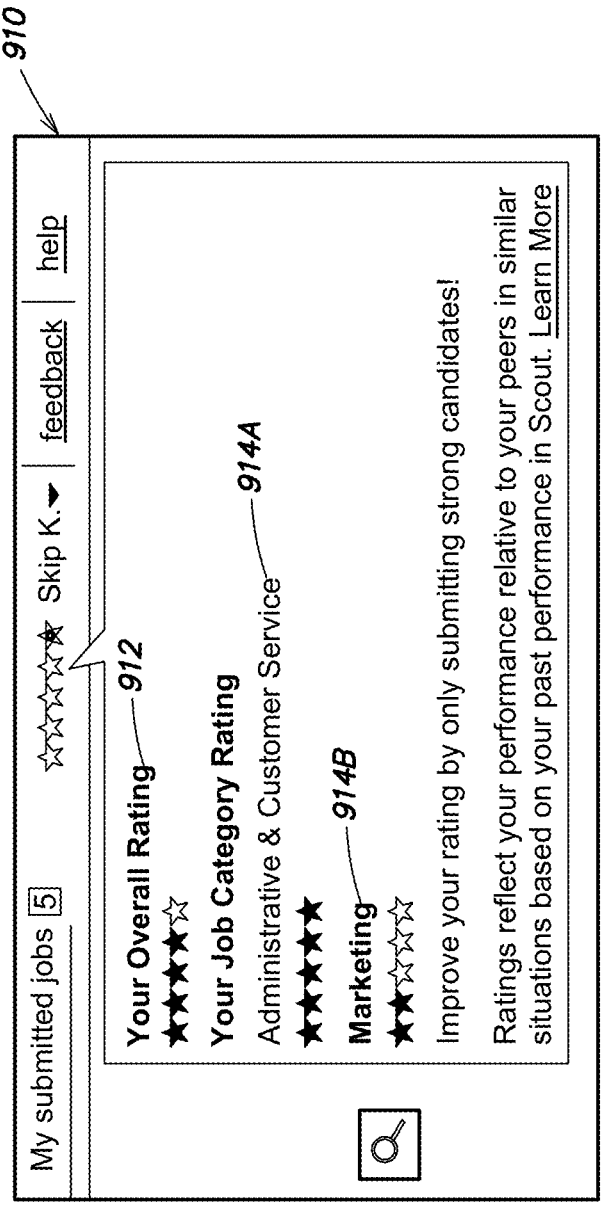

FIGS. 9A-B illustrate example user interface screens 900 and 910 which may be generated by the exchange system within a staffing talent platform used by the staffing party. User interface screen 900 displays an overall rating 902 of the staffing party at the top of the screen 900. User interface screen 910 displays an overall rating 912, and multiple job category specific ratings 914A-B for the staffing party. In some embodiments, the exchange system may be configured to display the multiple ratings in response to detecting a selection of the overall rating 902 in screen 900. For example, the exchange system may detect a click of an option proximate the overall rating and, in response, display the multiple ratings 912, and 914A-B as shown in user interface screen 910.

After displaying the staffing party rating(s) at block 312, process 300 returns to block 304, where the exchange system continues to return further candidate submissions and proceeds through blocks 306-314 to update the rating(s) and then display the updated rating(s) in the user interface(s) of the talent platform(s).

Figure 4:
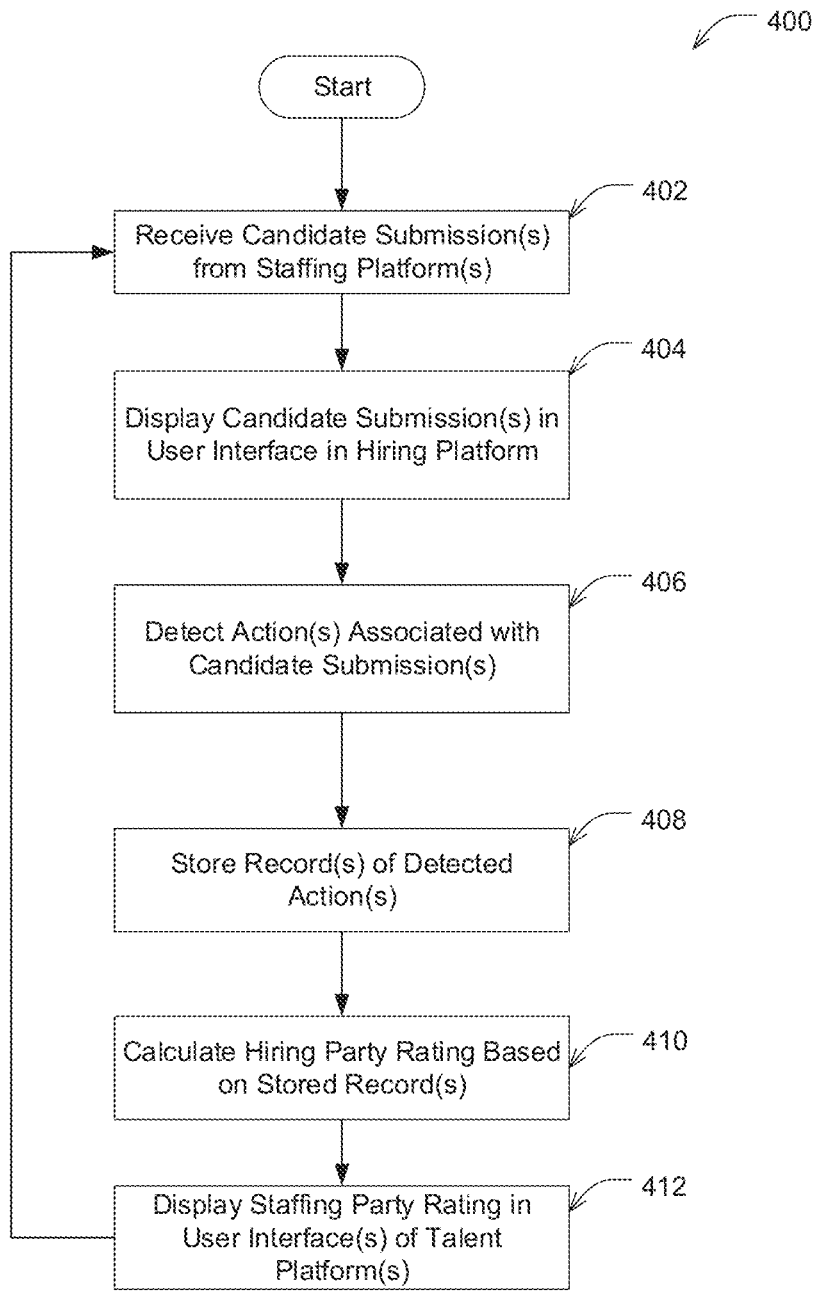
FIG. 4 shows a process for determining a rating for a hiring party according an aspect of the present application.

FIG. 4 shows an example process 400 for determining a rating for a hiring party according to an aspect of the present invention. Process 400 may be performed by exchange system 101 described above with reference to FIG. 1.

Process 400 begins at block 402 where the exchange system receives one or more candidate submissions from one or more staffing talent platforms. In some embodiments, the exchange system may be configured to generate a user interface in the staffing talent platform(s) via which the exchange system receives the candidate submissions. For example, the exchange system may be configured to generate user interface screen 500 described above with reference to FIG. 5 and/or user interface screen 600 described above with reference to FIG. 6 via which the exchange system may receive the candidate submission(s) from the staffing talent platform(s).

Next, process 400 proceeds to block 404 where the exchange system displays candidate submissions within a hiring talent platform used by the hiring party. In some embodiments, the exchange system may be configured to generate a user interface within the hiring talent platform that indicates candidates submitted to one or more job requisitions associated with the hiring party. The exchange system may have previously received the job requisitions from the hiring talent platform. In some embodiments, the exchange system may be configured to generate a user interface in the hiring talent platform via which the exchange system receives the job requisitions.

Figure 10:
FIG. 10 shows an example of a user interface screen in a talent platform displaying job requisitions received from a hiring party, according to an aspect of the present application.

FIG. 10 illustrates an example user interface screen 1000 that may be generated by the exchange system within the hiring talent platform displaying job requisitions that have been received by the exchange system from the hiring party. The user interface screen 1000 includes options 1002 that allow the hiring party to view a listing for a job requisition. The user interface screen 1000 includes an indication 1004 of a status of candidates that have been submitted to the job requisition. For example, the user interface screen 1000 includes a display of a number of pending candidates, a number of accepted candidates, a number of candidates who the hiring party has indicated are not of interest for the job requisition, a number of expired candidates, and a total number of candidates that have been accepted to the job requisition.

Figure 11:
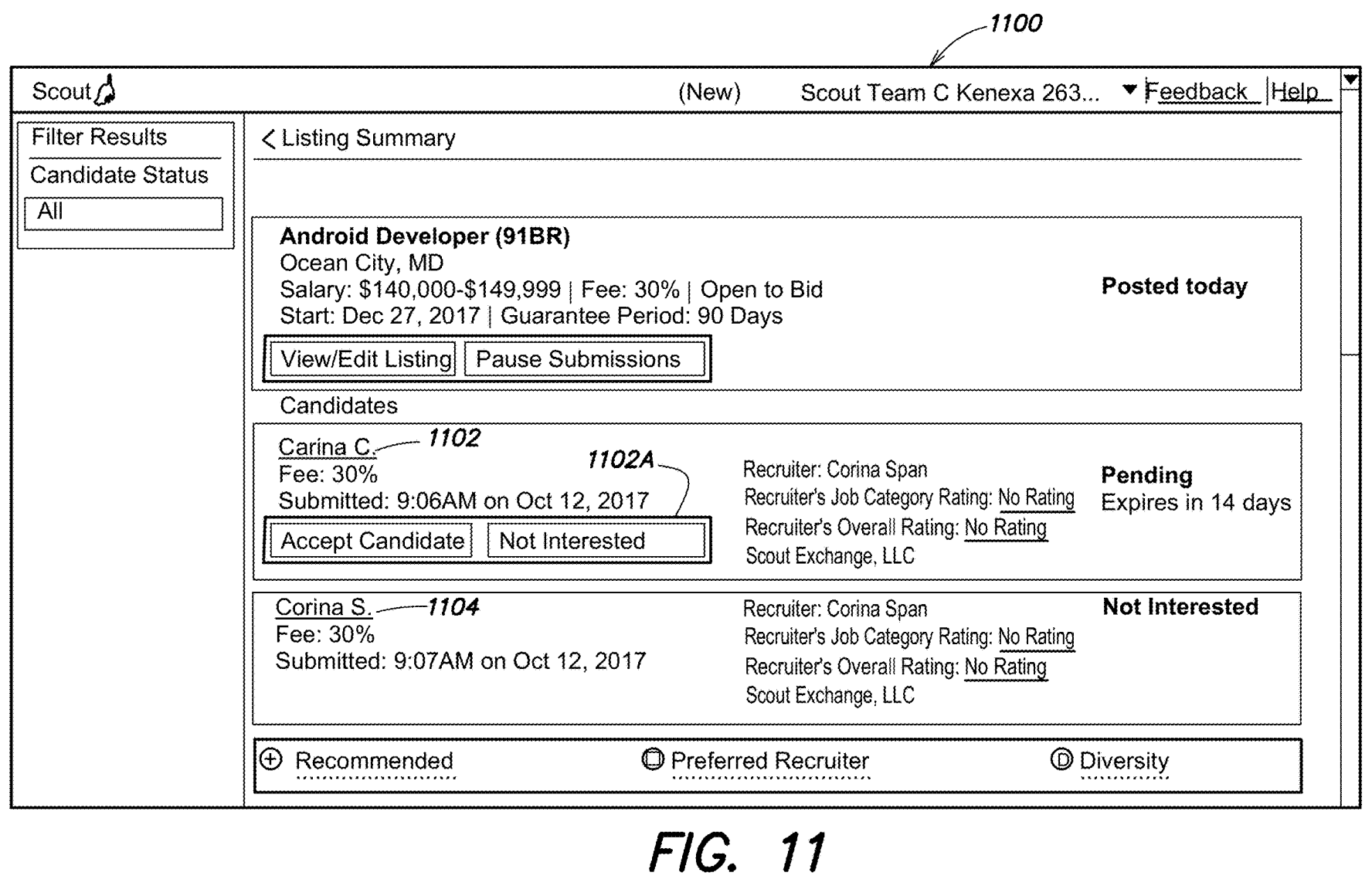

FIG. 11 illustrates an example user interface screen 1100 that may be generated by the exchange system within the hiring talent platform. User interface screen 1100 shows candidates 1102-1104 that have submitted to a job requisition associated with the hiring party. The exchange system may be configured to generate user interface screen in response to detecting a selection of a job requisition displayed in screen 1000 shown in FIG. 10. The user interface screen 1100 may include options 1102A that allow the hiring party to accept a candidate or indicate that the hiring party is not interested in the candidate. The exchange system may be configured to update a stored status of the candidate in the exchange system in response to receiving a selection of one of the options 1102A.

Figure 12:
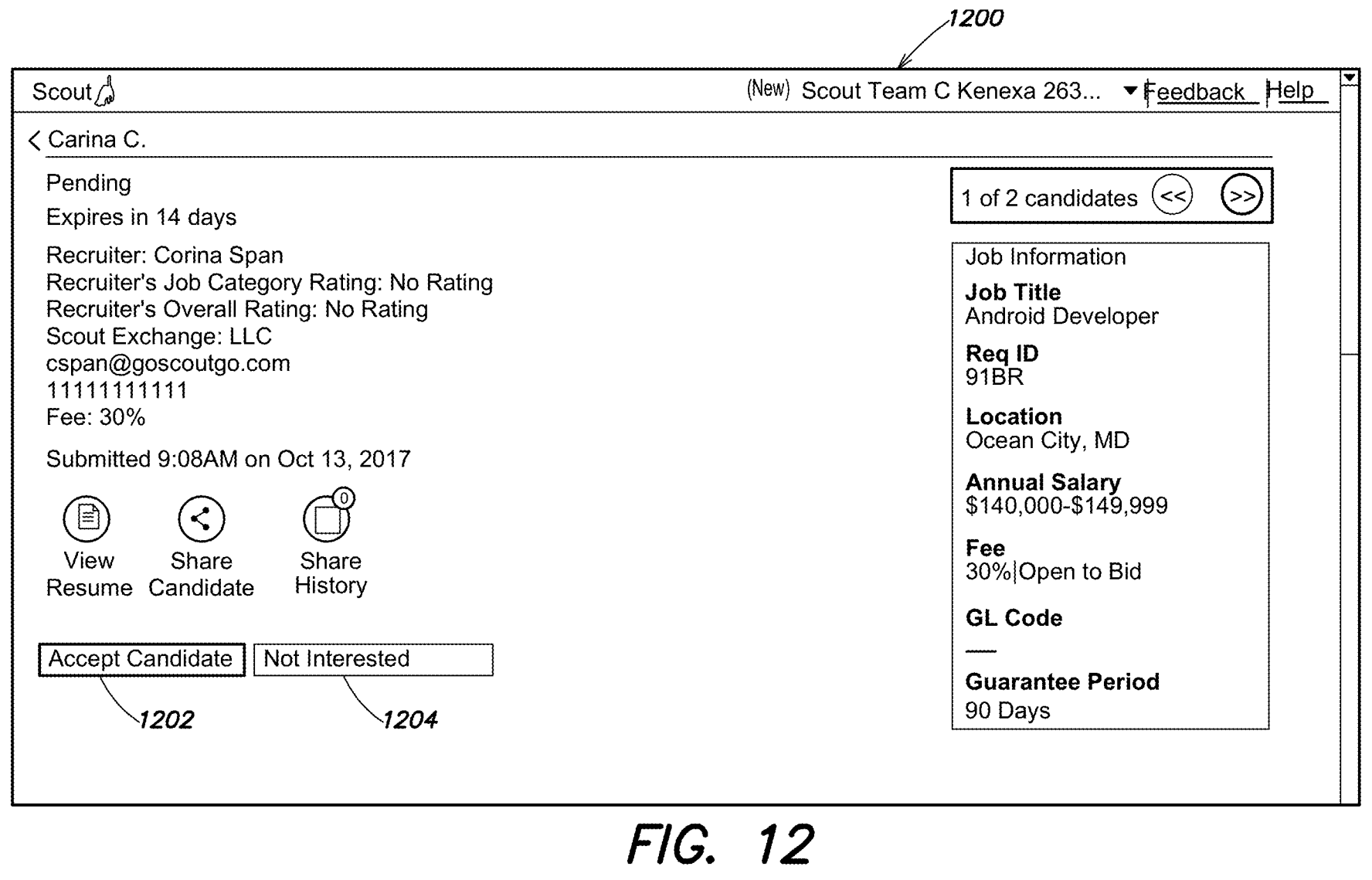

FIG. 12 illustrates an example user interface screen 1200 that may be generated by the exchange system within the hiring talent platform. User interface screen 1200 shows more information about a particular candidate. The exchange system may be configured to generate user interface screen 1200 in response to detecting selection of one of the candidates displayed in user interface screen 1100. User interface screen 1200 shows information about the candidate such as identification information about a staffing party that submitted the candidate, and a fee associated with placing the candidate. User interface screen 1200 further provides options 1202-1204 for the hiring party to take an action with respect to the candidate submission. The user interface screen 1200 provides an option 1202 for the hiring party to accept the candidate. If the option 1202 is selected, the exchange system may detect that the candidate has been accepted by the hiring party. If the option 1204 is selected, the exchange system may detect that the candidate has been rejected by the hiring party.

After displaying candidate submission(s) in the hiring talent platform, process 400 proceeds to block 406 where the exchange system detects one or more actions associated with the candidate submission(s). In some embodiments, the exchange system may be configured to generate a user interface within the hiring talent platform that allows the hiring party to take various actions with respect to a candidate submission. For example, as described above with references to FIGS. 11-12, the exchange system may generate one or more user interface screens that include selectable options for accepting the candidate or indicating that the hiring party is not interested in the candidate (e.g., rejecting). In some embodiments, the exchange system may be configured to detect the action(s) based on detecting selections within the user interface generated in the hiring talent platform. For example, the exchange system may detect that the hiring party has accepted or rejected a candidate.

Next, process 400 proceeds to block 408 where the exchange system stores one or more records for the detected action(s). In some embodiments, the exchange system may be configured to store a data profile associated with the hiring party within a database of the exchange system. The exchange system may store records of actions taken by the hiring party in the data profile. In some embodiments, the exchange system may be configured to store metadata and/or contextual data associated with the action. In some embodiments, the exchange system may be configured to store a time (e.g., a timestamp) at which the time was taken. In some embodiments, the exchange system may be configured to determine a period of time that was taken by the hiring party to perform the action. In some embodiments, the exchange system may be configure to calculate the time as an amount of time between at time at which the candidate was submitted to the job requisition and a time at which the action was taken. In some embodiments, the exchange system may be configured to calculate the time taken to perform the action as an amount of time between a time at which the hiring party was notified of the candidate submission within the hiring talent platform and a time at which the action was taken.

Next, process 400 proceeds to block 410 where the exchange system calculates rating for the hiring party based on the stored record(s). In some embodiments, the exchange system may be configured to calculate a rating between 1 and 5. In some embodiments, the exchange system may be configured to calculate a rating value between 1 and 10. In some embodiments, the rating may be on a continuous scale. In some embodiments, the exchange system may be configured to calculate discrete rating values (e.g., 1, 2, 3, 4, or 5).

In some embodiments, the exchange system may be configured to calculate the rating based on one or more measures of responsiveness of the hiring party to candidate submissions. In some embodiments, the exchange system may be configured to determine an average response time of the hiring party. The exchange system may be configured to determine the average time using the stored records of times taken by the hiring party to perform actions. The exchange system may be configured to calculate the hiring party rating based on the average response time. In some embodiments, the exchange system may be configured to determine a percentage of candidates that the hiring party has dispositioned. For example, the exchange system may be configured to determine a percentage of total candidate submissions to job requisitions associated with the hiring party that have either been accepted or rejected by the hiring party. The exchange system may be configured to additionally or alternatively calculate the hiring party rating based on the percentage of the candidates that the hiring party has dispositioned. In some embodiments, the exchange system may be configured to determine a percentage of candidate submissions that the hiring party has viewed. For example, the exchange system may store a record of candidate submissions that have been accessed in the hiring talent platform. The exchange system may use the stored records to determine a percentage of candidate submissions that have been viewed by the hiring party. In some embodiments, the exchange system may be configured to use the percentage of viewed candidate submissions to calculate a rating.

In some embodiments, the exchange system may be configured to determine whether one or more fields of a job requisition have been filled by the hiring party. The exchange system may determine whether one or more types of information have been provided in a submission of a job requisition submitted to the exchange system. For example, the exchange system may determine whether salary information and/or geographic information has been included in the job requisition.

In some embodiments, exchange system may be configured to use a combination of one or more of the measured values described herein to determine the rating for the hiring party. In some embodiments, the exchange system may be configured to normalize the determined value(s). For example, the exchange system may normalize the value(s) with respect to an average performance across all hiring parties in the exchange system. In some embodiments, the exchange system may be configured to calculate the rating based on a function that relates rating to a determined value indicating responsiveness (e.g., an average response time) of the hiring party. In some embodiments, the function may be a linear function relating responsiveness to rating. The linear function may be determined based on a distribution of responsiveness performance across all hiring parties that use the system. For example, values of responsiveness that place a hiring party in a top $20^{th}$ percentile of all hiring parties' responsiveness values may be given a rating of 5, whereas values of responsiveness that place a hiring party in a lowest $20^{th}$ percentile of responsiveness values may be given a rating of 1.

After calculating a rating for the hiring party based on the stored record(s), process 400 proceeds to block 412 where the exchange system displays the hiring party rating in one or more user interfaces in one or more talent platforms. In some embodiments, the talent exchange system may be configured to display the hiring party rating within user interfaces in hiring talent platforms and staffing talent platforms. The displayed ratings may allow hiring parties to view an indication of their performance in placement of candidates. The displayed ratings may also be used by staffing parties to select hiring parties (e.g., employers) for submission of candidates.

Figure 13:
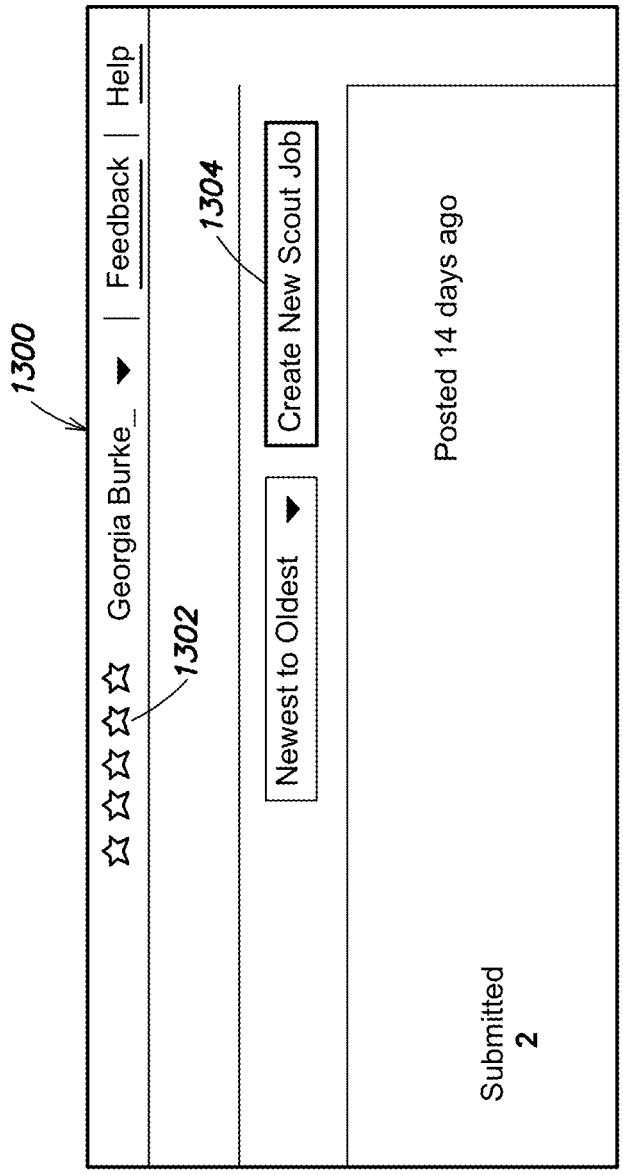
FIG. 13 shows an example of a user interface screen in a talent platform displaying a rating for a hiring party, according to an aspect of the present application.

FIG. 13 shows an example of a user interface screen 1300 that may be generated by the exchange system within a hiring talent platform. The user interface screen 1300 includes a display of a rating 1302 for a hiring party. The user interface screen 1300 further includes an option 1304 that, when selected, triggers generation of a new job requisition in the exchange system.

FIG. 14A shows an example of a user interface screen 1400 that may be generated by the exchange system within a staffing talent platform. The user interface screen 1400 displays job requisitions received by the exchange system from one or more hiring talent platforms used by one or more hiring firms. The user interface screen 1400 includes a display of a rating 1402 for the hiring party that submitted the job requisition. FIG. 14B shows an example of another user interface screen 1410 that may be generated by the exchange system within a staffing talent platform. The user interface screen 1410 shows details about a job requisition. For example, the exchange system 1410 may generate the user interface screen 1410 in response to a selection of a job requisition in user interface screen 1400. The user interface screen 1410 includes a display of a rating 1412 of a hiring party that submitted the job requisition.

Recruiter and Candidate Matching

Described herein are embodiments of a talent exchange system that automatically matches recruiter users of the system to job requisitions submitted to the system. The system tracks activity of the recruiter users. The activity may include actions performed in the system by the recruiter users in placing candidates for job requisitions. For example, the system may be configured to track a recruiter user's (1) candidate submissions for one or more job requisitions, (2) acceptances of the recruiter's candidate submissions by hiring parties into an interview process, and/or (3) hiring of the recruiter's candidate submissions. The system may include a database where the system stores records of the tracked activity for the recruiters. The system may use the stored records to train one or more models (e.g., neural network(s)) that output a measure of compatibility between a recruiter and a job requisition. The measure of compatibility may be a value indicating a likelihood that the recruiter will place a candidate for the job requisition. The system may match a recruiter to a job requisition by (1) determining, using the trained model(s), a measure of compatibility between the recruiter and the job requisition, and (2) determining to match the first recruiter to the job requisition based on the obtained measure of compatibility.

The inventors have recognized that computer-executed candidate to job matching systems do not reliably match candidates to job openings. Candidate to job matching systems may train machine learning models to match candidates to job openings. However, conventional systems are unable to access objective data that accurately represents candidates and jobs to train the machine learning models. Resumes often are not objective representations of candidates. For example, resumes contain information that is often biased towards the candidate, and subjective. Additionally, resumes may contain keywords that have been purposely included to trigger automated matching systems to select the resume. Job descriptions also do not accurately describe the jobs. For example, many job descriptions are modified versions of generic job descriptions that are found online, and thus do not provide accurate representations of jobs. As many resumes and job descriptions do not accurately and objectively represent candidates and jobs, the amount of reliable data for use in training machine learning models is limited. Due to the limit of reliable data available for training candidate to job matching systems, there is a limit to the accuracy of machine learning models for candidate to job matching. Thus, existing computer-executed candidate to job matching systems perform poorly.

Given the limited effectiveness of computer-executed candidate to job matching, hiring parties (e.g., employers) often turn to external staffing parties (e.g., recruiters) to find candidates for jobs. However, employers are unable to objectively determine how well a recruiter would perform in placing candidates for their jobs, and thus rely on subjective factors in selecting recruiters.

Some embodiments of the present application provide systems and techniques for facilitating placing candidates to jobs. The system tracks activity of recruiter users and hiring parties of the system to obtain an objective record of data that can be used to train one or more models to use in matching a recruiter to a job. Instead of relying solely on data that is biased or inaccurate such as resumes and job descriptions, embodiments of the present application automatically track user actions, and store records of the tracked actions. The stored data of activity provides an objective and unbiased set of data that may be used to train models. In some embodiments, the system trains one or more models to match a job requisition to a recruiter user of the system. The recruiter user may then work to find a suitable candidate for the job requisition. The use of objective activity data, and recruiter matching provides improvement in placement of candidates to job openings relative to conventional computer-executed candidate to job matching solutions.

As used herein, the term "recruiter user" may refer to an individual recruiter, a staffing firm, staffing party, or other entity using the system to manage recruitment of candidates. A hiring party may refer to an employer, employer representative, a hiring manager, or other entity using the system to manage hiring of one or more candidates for a job opening.

In some embodiments, the exchange system may be configured to match job requisitions to recruiters or to candidates stored in the exchange system. The exchange system may be configured to determine a match score and the match score may be used to provide recommendations to users of the systems. In some embodiments, the exchange system may be configured to match a job requisition to (1) a staffing or search firm recruiter or (2) to a candidate based on information about the recruiter or the candidate. For example, the exchange system may be configured to match the job to a recruiter based on the recruiter transaction history and rating and/or match the job to a candidate based on the candidate's profile in the exchange system, and/or a resume of the candidate stored by the exchange system.

In some embodiments, the exchange system may be configured to augment recruiter or candidate matching by augmenting the job, recruiter and/or candidate data set to create better matches. In some embodiments, the exchange system may be configured to match a job to a staffing party and may augment the data set with additional job description information as well as company profiles of the hiring party and the previous hiring parties for which the staffing party has transaction history. In some embodiments, the exchange may be configured to match a job to a candidate using augmented data sets which include company profiles of the hiring company, profiles and ratings of the recruiters, related job descriptions and other information associated with the job specification as well as company profiles, job descriptions and other data sets associated with the candidate profile. The exchange system may be configured to use the recruiter matching results to augment candidate matching to job requisitions. For example, if a staffing party associated with a candidate matches strongly with the job type and the hiring party profile, the exchange system may increase a score of a candidate match to a job requisition associated with the hiring party.

In some embodiments, the exchange system may be configured to use a candidate's work history to determine matches to one or more job requisitions. The exchange system may be configured to receive information about the work history. As noted above, in some embodiments, the exchange system may be configured to look up and retrieve additional information about the works history. For example, the exchange system may retrieve information about one or more employers in a work history of the candidate, information about industries that the candidate has worked in, and other information. The exchange system may be configured to augment a candidate profile in the exchange system with the information. Additionally, the information may be used by the exchange system to generate a match score that indicates a level (senior contributor, manager, director, etc) at which the candidate matches to a job requisition. In some embodiments, the information may be input into a machine learning system that outputs a match score.

In some embodiments, the exchange system is configured to use work history of a candidate to retrieve additional information to use in matching the candidate to job requisitions. In some embodiments, the exchange system may be configured to access job descriptions, job types, and/or titles. The exchange system may retrieve the information from one or more job requirements on Internet web pages. In some embodiments, the exchange system may be configured to access a job description from a specific company, a similar company, and/or information from a similar job type.

In some embodiments, the exchange system may be configured to use candidate match scores to identify training and development needs for a candidate. For example, the exchange system may be configured to determine skills or education that the candidate needs to improve a match with certain job requisitions.

Figure 15:
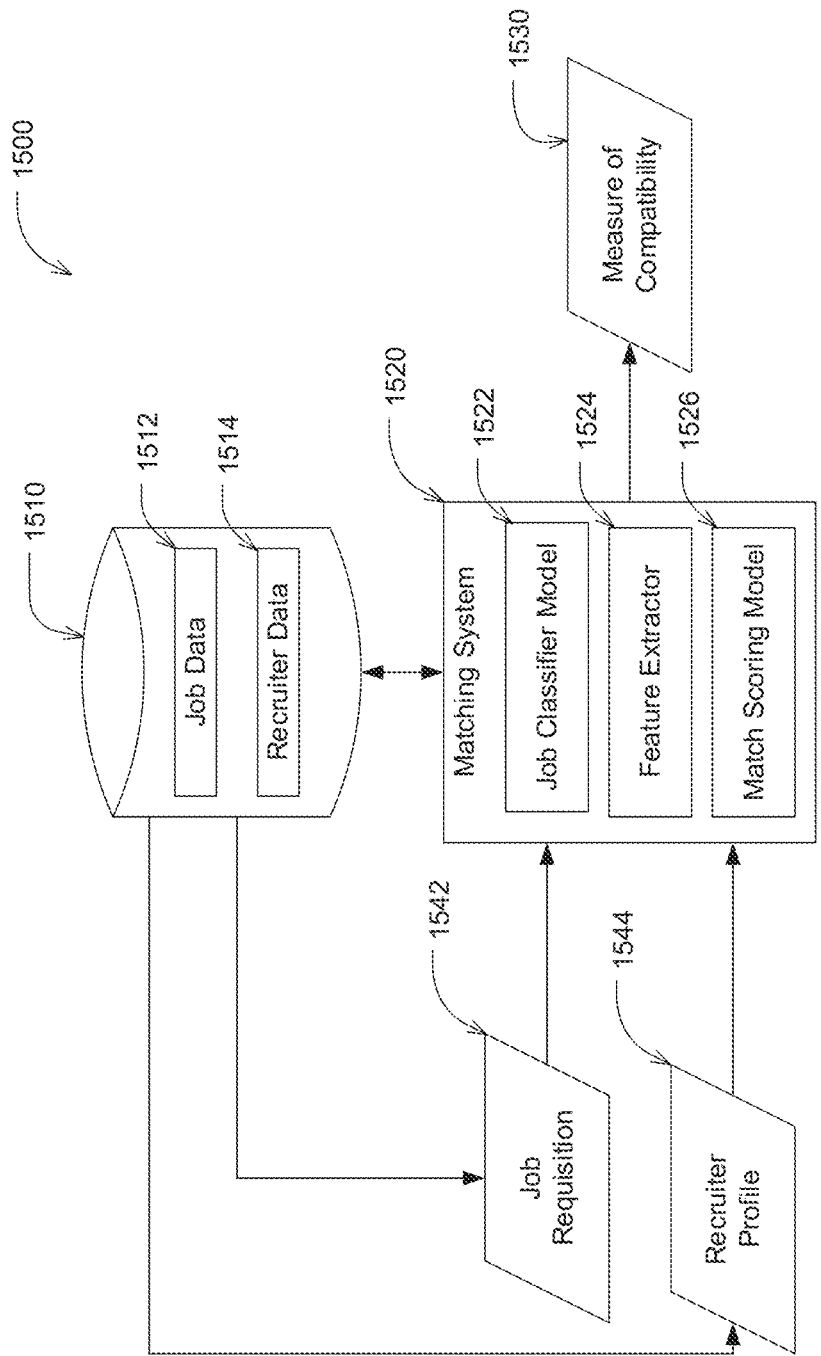
FIG. 15 shows a block diagram of a system for matching a recruiter to a job, according to an aspect of the present application.

FIG. 15 shows a block diagram of a distributed computer system 1500 capable of implementing various embodiments of the present application. In some embodiments, the system 1500 may form one or more components of the talent exchange system 101 described above with reference to FIG. 1. The computer system 1500 includes a database 1510, and a matching system 1520 which uses data from the database to train one or more models which are used by the matching system 1520 to determine a measure of compatibility 1530 between a recruiter user's profile 1544, and a job requisition 1542.

In example embodiment of FIG. 1, the system 1500 stores job data 1512 in the database 1510. In some embodiments, the job data 1512 may include information about one or more job openings that have been submitted to the talent exchange system 1500. In some embodiments, hiring party users (e.g., employers) of the system may submit job requisitions for job openings. A job requisition may include information about a respective job. For example, the job requisition may include information specifying desired qualifications for the job, location, salary, job type, or other information about the job. In some embodiments, the system 1500 may be configured to store, in the database 1510, data records for the job requisitions submitted to the system 1500.

In the example embodiment of FIG. 1, the system 1500 stores recruiter data 1514 in the database 1510. In some embodiments, recruiter data 1514 may include information about recruiter users of the system 1500. In some embodiments, the system 1500 may be configured to include records of activity of the recruiter users. The system may be configured to generate the records of activity by tracking actions for placement and/or submission of candidates for job requisitions. For example, the system may be configured to generate records of a recruiter user's candidate submissions, submission acceptances, hires, employers for whom the recruiter user has placed candidates, locations of job requisitions that the recruiter user has placed candidates for, fee for candidate placement, experience level of job requisitions that the recruiter user has previously placed candidates for and/or time to hire. Other examples of actions that can be tracked by the system are discussed herein.

In some embodiments, the system 1500 may be configured to determine values of one or more parameters based on tracked activity. The system 1500 may be configured to store the determined values as part of the recruiter data 1514. In some embodiments, system 1500 may be configured to determine values of one or more measures of performance of the recruiter in placing candidates. For example, the system 1500 may be configured to determine an acceptance rate of candidate submissions of the recruiter user, a percentage of candidate, submissions of the recruiter user that are hired, average time taken by the recruiter user in responding to requests, time taken to hire a candidate for one or more job requisitions by the recruiter user, experience level of job requisition(s) that the recruiter user has placed candidates for, and/or other parameters.

In some embodiments, the system 1500 may be configured to track activity of the recruiter by job category. The system 1500 may be configured to store a record of activity of the recruiter user for individual job categories. In some embodiments, the record of activity for an individual job category may include values of one or more measures of performance (e.g., candidate submission acceptance rate, candidate hire rate) for the job category. Examples of measures of performance are described herein. A job category may refer to a classification of a job determined based on characteristics of the job. Examples of job categories include engineering, electrical engineering, mechanical engineering, chemical engineering, civil engineering, law, investment banking, teaching, research and development, construction, and/or other job categories. In some embodiments, the number and types of job categories used by the system 1500 may vary, and/or be updated. In some embodiments, the job categories may be a static set of job categories.

In some embodiments, the database 1510 may be physical storage (e.g., a hard drive) that is co-located with the system 1500. In some embodiments, the database 1510 may be one or more storage servers.

In the embodiment shown in FIG. 15, the matching system 1520 includes a job classifier model 1522 configured to determine one or more job categories associated with a job requisition. The matching system 1520 also includes a match scoring model 1526 configured to output a measure of compatibility 1530. In some embodiments, the matching system 1520 may be configured to use the job data 1512 and the recruiter data 1514 stored in the database 1510 to train the job classifier model 1522, and the match scoring model 1526. The matching system 1520 further includes a feature extractor 1524 configured to generate values of one or more features that are used by the models of the matching system 1520. Examples of features are described herein.

In some embodiments, the job classifier model 1522 may take as input values of one or more features determined from information in a job requisition. The feature(s) may include a representation of a textual job description, specified qualifications, specified education, indication of salary, job title, an indication of a level of responsibility, a number of employees that are to report to the position, a size of the employer and/or other information from the job requisition.

In some embodiments, the feature extractor 1524 may be configured to generate the values of the feature(s) from information in the job requisition.

In some embodiments, the job classifier model 1522 may be trained using a set of job requisitions and pre-determined job categories associated with the job requisitions. For example, the database 1510 may have stored a set of job requisitions, and job categories manually assigned to each of the job requisitions. The matching system 1520 may use the pre-labeled data as training data to perform supervised learning to train the job classifier model. In some embodiments, the matching system 1520 may be configured to use job requisitions that the model 1522 has previously classified into job categories as training data. For example, the matching system 1520 may have determined job categories associated with a set of job requisitions. The set of job requisitions, and determined job categories may form all or part of a training data set used to train the job classifier model 1522.

In some embodiments, the job classifier model 1522 may include a neural network. For example, the job classifier model 1522 may include an artificial neural network (ANN), a recursive neural network (RNN), a convolution neural network (CNN), another type of neural network, or a combination thereof. In some embodiments, the job classifier model 1522 may include a support vector machine. In some embodiments, the job classifier model 1522 may include a decision tree model. In some embodiments, the job classifier model 1522 may include a regression model. For example, the job classifier model 1522 may include a linear regression model, or a logistic regression model. In some embodiments, the job classifier 1522 may include a combination of multiple different models.

In some embodiments, the classifier model 1522 may include a natural language processing model configured to process language in textual data (e.g., job description and/or job title) of a job requisition. For example, the natural language processing model may be configured to process a textual job description of the job requisition to identify one or more keywords and associated weights. The keywords and associated weights may be used to classify the job requisition into one or more categories. In some embodiments, the natural language processing model may include a RNN. In some embodiments, the natural language processing model may include a Transformer machine learning model.

In some embodiments, the natural language processing model may be configured to use latent semantic analysis (LSA) to vectorize textual data of the job requisition, and classifying the job requisition into one or more categories based on the vectorized textual data. For example, the vectorized textual data may be used as input to one or more models (e.g., RNN, Transformer).

In some embodiments, the match scoring model 1526 may be configured to receive, as input, values of one or more features, and output the measure of compatibility 1530 based on the values of the feature(s). The feature(s) may include textual job description of the job requisition 1542, textual job descriptions of one or more previous job requisitions that the recruiter use has placed candidates for, a location of the job requisition 1542, and/ or locations specified by one or more job requisitions that the recruiter user has previously placed candidates for. In some embodiments, the feature(s) may include values of one or more measures of performance of the recruiter user. The measures of performance may include values indicating whether the recruiter user has a relationship with a hiring party that submitted the job requisition 1542, acceptance rate(s) of the recruiter user, hiring rate(s) of the recruiter user time taken by the recruiter user in placing a candidate for one or more job requisitions that the recruiter user has placed candidates for, total number of candidates placed by the recruiter user (e.g., number of submitted candidates that have been hired), experience level of the job requisition 1542, and/or experience level of one or more job requisitions that the recruiter user has placed candidates for. In some embodiments, the match scoring model 1526 may be configured to receive values of one or more features that are determined by job category. For example, the match scoring model 1526 may receive hiring rate, acceptance rate, number of candidates placed, and/or other measures of performance as determined by the system for each of one or more job categories.

In some embodiments, the matching system 1520 may be configured to use the recruiter data 1514 and the job data 1512 to train the match scoring model 1526. In some embodiments, the matching system 1520 may be configured to use records of past recruiter activity to train the match scoring model 1526. The matching system 1520 may be configured to use records of activity associated with one or more job requisitions for which candidates have been placed by recruiter users of the system 1500.

In some embodiments, the match scoring model 1526 may include a neural network. For example, the match scoring model 1526 may include an artificial neural network (ANN), a recursive neural network (RNN), a convolution neural network (CNN), or another type of neural network, or a combination thereof. In some embodiments, the match scoring model 1526 may include a support vector machine. In some embodiments, the match scoring model 1526 may include a decision tree model. In some embodiments, the match scoring model 1526 may include a regression model. For example, the match scoring model 1526 may include a linear regression model, or a logistic regression model. In some embodiments, the match scoring model 1526 may include a combination of multiple different types of models.

In some embodiments, the matching system 1520 may be configured to use the job categories associated with a job requisition determined using the job classifier model 1522 to determine values of one or more features that are to be input into the match scoring model 1526. The feature extractor 1524 may be configured to generate values of the feature(s) for each of one or more job categories determined for the job requisition 1542 by the job classifier model 1522. For example, the feature extractor 1524 may be configured to determine values of one or more measures of performance of the recruiter user for each of the determined job categories.

In some embodiments, the system 1500 may be configured to access a recruiter profile 1544 which is used by the matching system 1520 to determine the measure of compatibility 1530 with the job requisition 1542. In some embodiments, the matching system 1520 may be configured to access the recruiter profile 1544 from the database 1510. In some embodiments, the recruiter profile 1544 may be a profile of a recruiter user specifying values of one or more measures of performance. Examples of measures of performance are described herein. An example recruiter profile is described below with reference to FIG. 16.

In some embodiments, the exchange system 1500 may be configured to use the measure of compatibility 1530 determined by the matching system 1520 to match a recruiter user associated with the recruiter profile 1544 to the job requisition 1542. For example, the system 1500 may be configured to determine if the measure of compatibility exceeds a threshold value. If the measure of compatibility exceeds the threshold value, the system 1500 may match the recruiter user to the job requisition 1542. In some embodiments, the system 1500 may be configured to use the matching to recommend the job requisition 1542 to the recruiter user and/or to recommend the recruiter user to a hiring party that submitted the job requisition 1542 in the system 1500. For example, the system 1500 may be configured to generate a notification in a user interface of the recruiter user generated by the system, and/or in a user interface of the hiring party user generated by the system. In another example, the system 1500 may be configured to include the job requisition 1542 in a list of recommended job requisitions provided to the recruiter user in a user interface generated by the system 1500. In yet another example, the system 1500 may be configured to include an identification of the recruiter user in a list of recommended recruiter users provided to the hiring party in a user interface generated by the system 1500.

FIG. 16 shows a data structure 1600 of a profile for a recruiter user, according to some embodiments of the present application. In some embodiments, the talent exchange 1500 may be configured to store profiles for one or more recruiter users of the system using the data structure 1600.

In the embodiment shown in FIG. 16, the data structure 1600 includes a recruiter ID. In some embodiments, the system may be configured to store a recruiter ID that uniquely identifies a particular recruiter user in the system. The system may use the recruiter ID to track activity of the recruiter user, store records of the activity, and/or generate the profile for the recruiter user. For example, the recruiter ID may be an alphanumeric value assigned to a recruiter user when the recruiter user is registered with the system.

In the example embodiment of FIG. 16, that data structure 1600 includes fields 1604A-B for different job categories. In some embodiments, the job categories may be job categories assigned to job requisitions that the recruiter user has previously submitted candidates for. For example, if Job Category 1 may be engineering, and Job Category 2 may be research and development. In the example embodiment of FIG. 16, the data structure 1600 includes fields for storing values of one or more parameters for each job category field 1604A-B in the data structure 1600. The parameter(s) include an acceptance rate, a hire rate, and/or recruiter rating of the recruiter user for the particular job category. In some embodiments, the parameter(s) may include one or more other parameters in addition to, and/or instead of the parameters shown in the example embodiment of FIG. 16. In some embodiments, the system may be configured to determine values of the parameter(s) based on stored records of activity of the recruiter user in placing candidates.

In the example embodiment of FIG. 16, the data structure 1600 includes fields 1606A-B for different job requisitions that the recruiter user has previously placed candidates for. In some embodiments, the system may be configured to store information from one or more job requisitions that the recruiter user has previously placed candidates for. The system may be configured to store information such as a job title, location, a representation of a textual description, and/or an employer.

In the example embodiment of FIG. 16, the data structure 1600 includes fields 1608A-B for employers that the recruiter user has previously worked with. For example, the employers may be those that the recruiter user has previously submitted candidates to and/or placed candidates for. The system may store a relationship indicator for each employer. The relationship indicator may specify whether the recruiter user has an exclusive relationship with the employer in which the employer has committed to working with the recruiter user in placing candidates for job openings with the employer.

In the example embodiment of FIG. 16, the data structure 1600 includes fields 1610-1616 for values of one or more parameters that indicate performance of the recruiter user. The fields include a field 1610 for an acceptance rate of the recruiter user 1600 which indicates a ratio of candidate submissions by the recruiter user that are accepted into an interview process. Field 1612 is for a hire rate (e.g., placement rate) of the recruiter user 1600 which indicates a percentage of candidate submissions by the recruiter user that are hired. Field 1614 is a field for an average response time of the recruiter user which indicates how responsive the recruiter user. Field 1616 is for a recruiter rating 1616 determined for the recruiter user.

In some embodiments, the system may be configured to use information stored in the data structure 1600 to generate an input to one or more models used for matching recruiter users to job requisitions. For example, the system may be configured to use the information from the recruiter profile to generate values of one or more features used by one or more models to determine a measure of compatibility between the recruiter user and a job requisition.

In some embodiments, the system may be configured to store information instead of and/or in addition to the information shown in the example embodiment of FIG. 16. Some embodiments are not limited to a particular set of information. In some embodiments, the system may be configured to store values of any of the measures of performance discussed herein as part of the data structure 1600.

Figure 17:
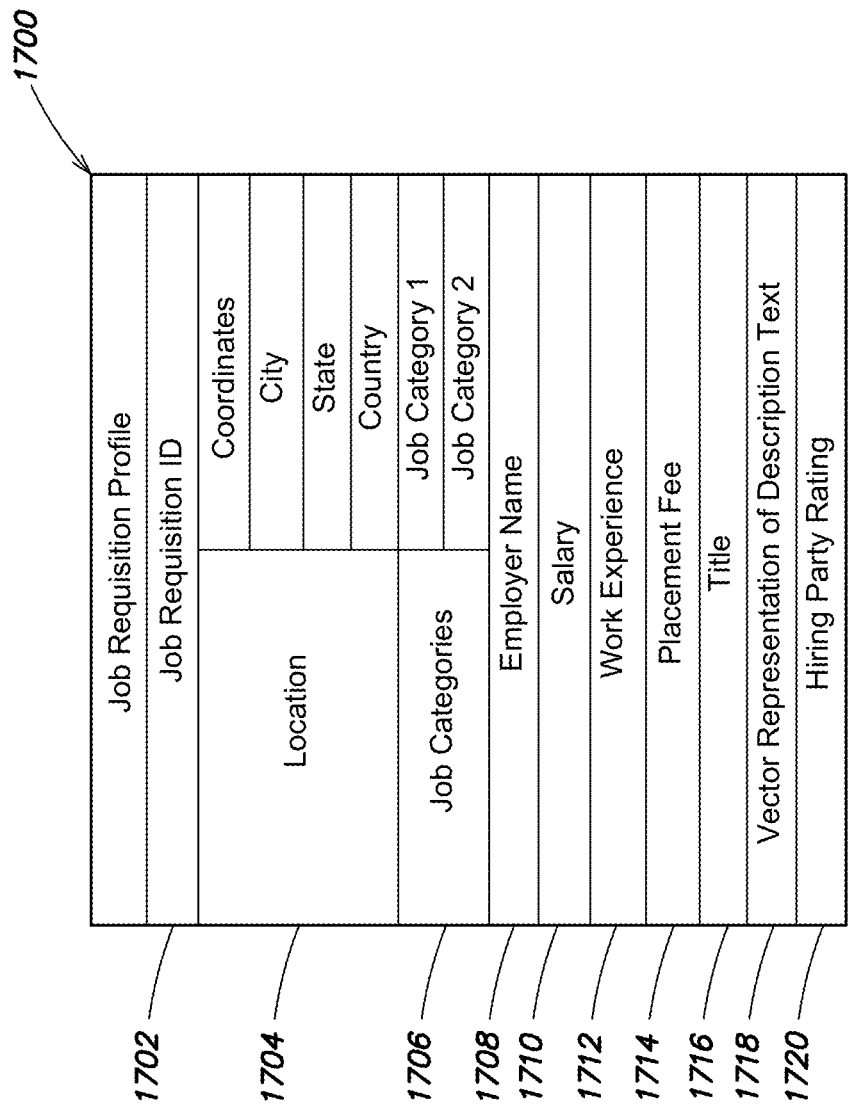
FIG. 17 shows an example data structure used for storing a job requisition record, according to an aspect of the present application.

FIG. 17 shows a data structure 1700 of a profile for a job requisition, according to some embodiments of the present application. In some embodiments, the talent exchange system 1500 may be configured to store profiles for one or more job requisitions using the data structure 1700. For example, the system 1500 may be configured to extract values from a job requisition submitted by a hiring party to store the extracted values in fields of the data structure 1700.

In the example embodiment shown in FIG. 17, the data structure 1700 includes a field 1702 for storing a job requisition ID. In some embodiments, the job requisition ID may be a unique identifier for a job requisition assigned by the system. The data structure 1700 includes a location field 1704. The location field 1704 may include one or more fields for storing location specifications. For example, the field(s) may include coordinates, a city, state, and/or country. The data structure 1700 includes a job categories field 1706 for storing one or more job categories that are associated with the job requisition. For example, the system may be configured to store job categories for the job requisition determined by the system. The data structure 1700 includes fields for storing an employer name 1708, an indication of salary 1710, work experience level 1712, a placement fee 1714, a job title 1716, a representation of a job description 1718 (e.g., a vector representation text), and/or a hiring party rating 1720 associated with a hiring party that submitted the job requisition.

In some embodiments, the system may be configured to retrieve a job requisition profile stored in a database of the system. The system may be configured to use the profile 1700 for generating an input to one or more models for matching recruiter users to job requisitions.

In some embodiments, the system may be configured to store information instead of and/or in addition to the information shown in the example embodiment of FIG. 16. Some embodiments are not limited to a particular set of information. In some embodiments, the system may be configured to store values of any attributes of a job requisition described herein.

Figure 18:
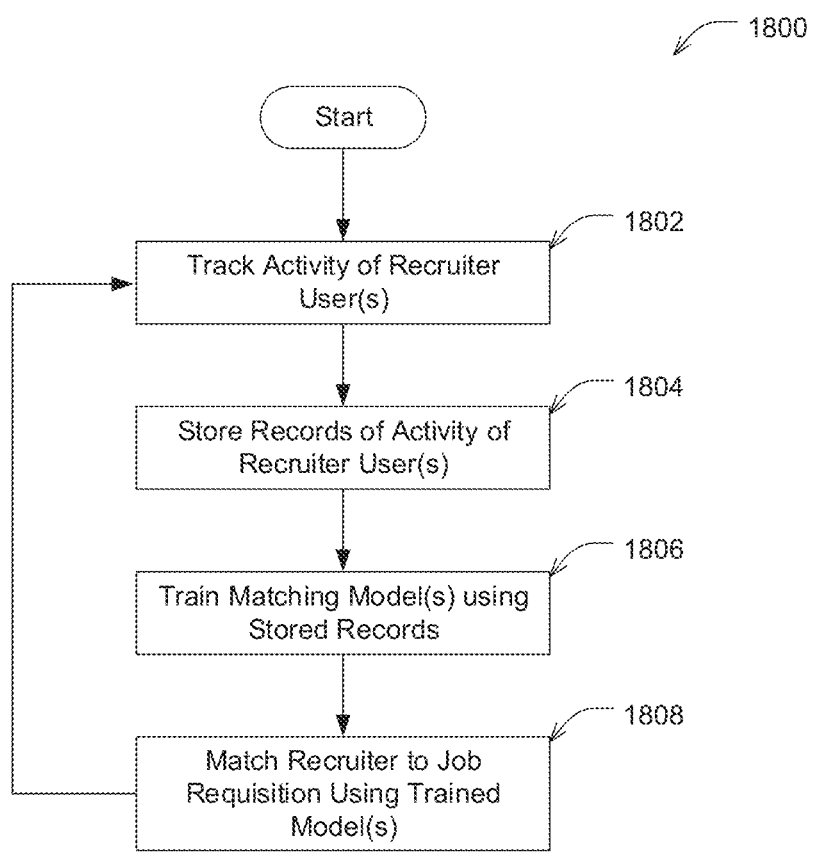
FIG. 18 shows a process of matching a recruiter user to a job requisition, according to an aspect of the present application.

FIG. 18 shows a flow chart of a process 1800 of matching a recruiter user to a job, according to some embodiments of the present application. In some embodiments, process 1800 may be performed by talent exchange system 1500 described above with reference to FIG. 15.

Process 1800 begins at block 1802, where the system tracks activity of recruiter users of the system. As described herein, the talent exchange system tracks activity of recruiter users in placing candidates for job requisitions. In some embodiments, the system may be configured to track, for a recruiter user, candidate submissions for job requisitions by the recruiter user, acceptances of the candidate submissions into an interview process, stages of the interview process of accepted candidates, and/or hiring of candidates. In some embodiments, the system may be configured to track time taken for various actions. For example, the system may be configured to track time taken by recruiter user to submit candidates. In some embodiments, the system may be configured to track one or more actions described herein. For example, the system may be configured to track actions described above with reference to FIGS. 3 and 4.

Next, process 1800 proceeds to block 1804 where the system stores records of activity of the recruiter users. In some embodiments, the system may be configured to store a record for actions associated with each user. In some embodiments, a record may include an identification of the action, a timestamp, an identification of the recruiter user that the action is associated with, and/or other parameters. For example, when a candidate submitted by a recruiter user for a job requisition is hired by an employer that submitted the job requisition, the system may store a record indicating the hire. In another example, when a candidate submitted by a recruiter user for a job requisition is rejected by the employer, the system may store a record of the rejection. In some embodiments, the system may be configured to store information about the job requisition as part of the record such as one or more job categories that the job requisition has been classified into, a location specified by the job requisition, an identification of the employer, and other information.

In some embodiments, the system may be configured to determine values of one or more parameters. The system may be configured to calculate the values of the parameter(s) based on data collected from tracking actions in the system. For example, the system may determine values of one or more measures of performance such as hiring rate associated with the recruiter user. In another example, the system may determine a hiring rate associated with the recruiter user for one or more specific job categories. In some embodiments, the system may be configured to store a data profile for one or more recruiter users. An example of a recruiter profile is discussed above with reference to FIG. 16. In some embodiments, the system may be configured to update one or more fields of data profile of the recruiter user(s) based on the tracked activity of the recruiter user(s).

Next, process 1800 proceeds to block 1806 where the system uses the stored records to train one or more models that are used to match recruiter users to job requisitions. In some embodiments, the model(s) may be configured to determine a measure of compatibility between a recruiter user and a job requisition. Examples of model(s) are discussed herein. In some embodiments, the measure of compatibility may indicate a likelihood that the recruiter user will successfully place a suitable candidate for the job requisition. For example, the measure of compatibility may be a probability that the recruiter user will place a suitable candidate for a job requisition. In another example, the measure of compatibility may be a numerical score that indicates the likelihood that the recruiter user will place a suitable candidate for the job requisition.

In some embodiments, the system may be configured to train the model(s) using machine learning training techniques. In some embodiments, the system may be configured to train the model(s) using a supervised learning technique in which a training set of data includes sample inputs, and corresponding outputs. The training data may be used to train the model(s). For example, the system may be configured to train one or more neural networks using backpropagation algorithms. Some embodiments are not limited to specific types of model(s) and/or training techniques.

Next, process 1800 proceeds to block 1808 where the system uses the trained model(s) to match recruiter users to job requisitions. In some embodiments, the system may be configured to use the trained model(s) to determine a measure of compatibility (e.g., a matching score) between a recruiter user and a job requisition. The system may use the score to then determine whether to match the recruiter user to the job requisition. For example, the system may determine that a value of the measure compatibility exceeds a threshold value and, in response, determine to match the recruiter user to the job requisition. Otherwise, the system may determine not to match the recruiter user to the job requisition. In some embodiments, the system may be configured to recommend the recruiter user to an employer that submitted the job requisition in response to determining to match the recruiter user to the job requisition. In some embodiments, the system may be configured to recommend the job requisition to the recruiter user in response to determining to match the recruiter user to the job requisition.

Figure 19:
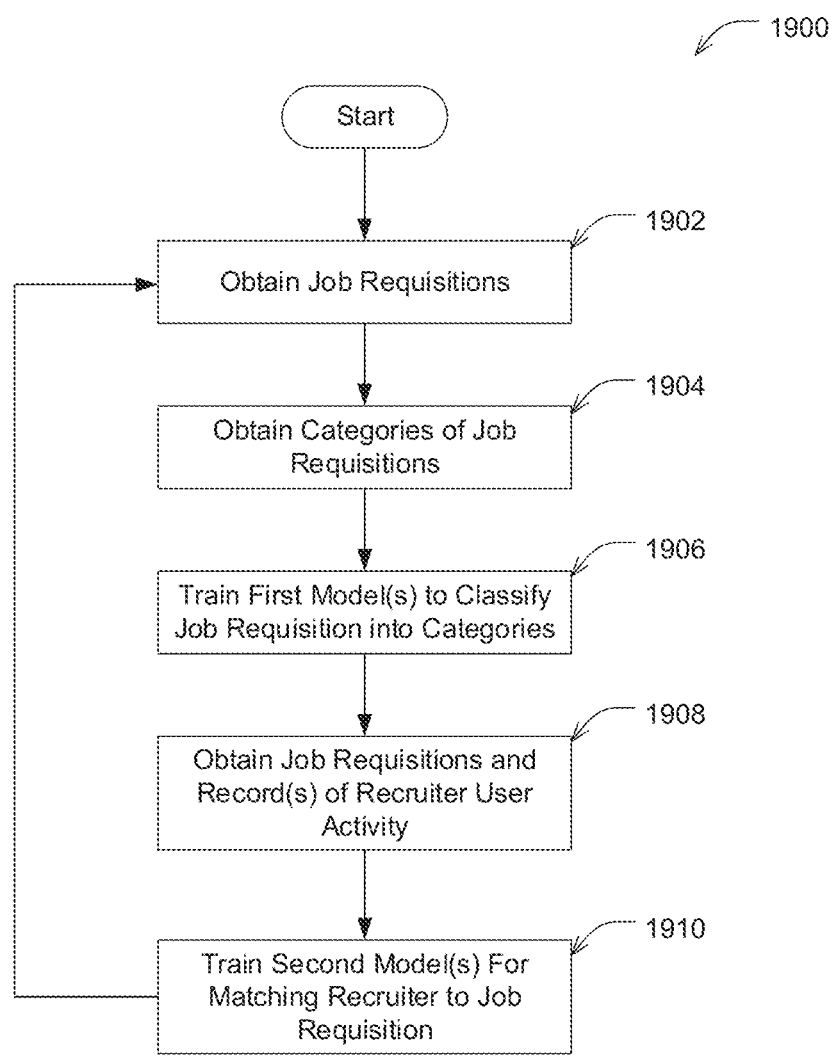
FIG. 19 shows a process of training models for use in matching a recruiter to a job requisition, according to an aspect of the present application.

FIG. 19 shows a flow chart of a process 1900 of training models for use in matching job recruiters to job requisitions, according to some embodiments. In some embodiments, the process 1900 may be performed by system 1500 described above with reference to FIG. 15.

Process 1900 begins at block 1902 where the system obtains multiple job requisitions. In some embodiments, the system may be configured to obtain stored job requisitions from a database of the system. For example, the job requisitions may be job requisitions that have been submitted to the system by hiring parties in the past. In some embodiments, the job requisitions may be job requisitions for which recruiter users of the system have already placed candidates. In some embodiments, the system may be configured to obtain sample job requisitions that have been generated for training purposes.

Next, process 1900 proceeds to block 1904 where the system obtains job categories for the job requisitions obtained at block 1902. In some embodiments, the job categories may be manually determined by human users such that the data set is reliable. In some embodiments, the job categories may be obtained using one or more models that have been previously trained. Examples of job categories are discussed herein. In some embodiments, the system may be configured to store one or more job categories associated with each of the obtained job requisitions as a label or classification for the job requisition.

Next, process 1900 proceeds to block 1906 where the system trains a first set of one or more models that classify a job requisition into one or more job categories. In some embodiments, the first set of model(s) may be configured to output a classification result that indicates which job categories a job requisition most closely aligns with. For example, the first set of model(s) may output a numerical value associated with each of a set of possible job categories. Job categories associated with an outputted numerical score that exceeds a threshold may be determined as the job categories that the job requisition is to be classified into. Examples of models and training techniques are discussed herein.

Next, process 1900 proceeds to block 1908 where the system obtains records of recruiter user activity in the system. Example activity of recruiter user activity, and records thereof are discussed herein. In some embodiments, the system may be configured to access the records from a database of the system as described above with reference to FIG. 1. In some embodiments, the records of recruiter user activity obtained at block 1908 may include stored profiles of recruiter users, and one or more job requisitions that recruit users have placed candidates for.

Next, process 1900 proceeds to block 1910 where the system trains a second set of one or more models for matching a recruiter user of the system to a job requisition. In some embodiments, the system may be configured to train the second set of model(s) using one or more sets of training data generated using the records obtained at block 1908. The records may include input and output data that may form a training data set. For example, the input data may include values of one or more features determined based on recruiter user activity, performance of recruiters, information about jobs from the job requisitions, and/or indications of relationship between the recruiter users and job requisitions. In one example, the output data may include a numerical value (e.g., a score) associated with an input data point. In some embodiments, an input data point may be values of one or more features determined based on (1) a record of activity of a recruiter user, and (2) information specified in a job requisition. Examples of features are described herein.

In some embodiments, the system may be configured to train the second set of model(s) to output a measure of compatibility between a recruiter user and a job requisition. The measure of compatibility may be subsequently used to match recruiters to job requisitions.

After training the second set of model(s) at block 1910, process 1900 returns to block 1902 to repeat the process 1900. In some embodiments, the system may be configured to train the first and/or second sets of model(s) at regular intervals. For example, the system may be configured to retrain the first set of model(s) and/or the second set of model(s) every day, every week, every month, every year, or at another regular interval. In some embodiments, the system may be configured to train the first and/or second sets of model(s) in response to manual instruction. For example, the system may receiving an input from a user interface of the system and, in response, trigger training of the first and/or second sets of model(s) as described herein.

Figure 20:
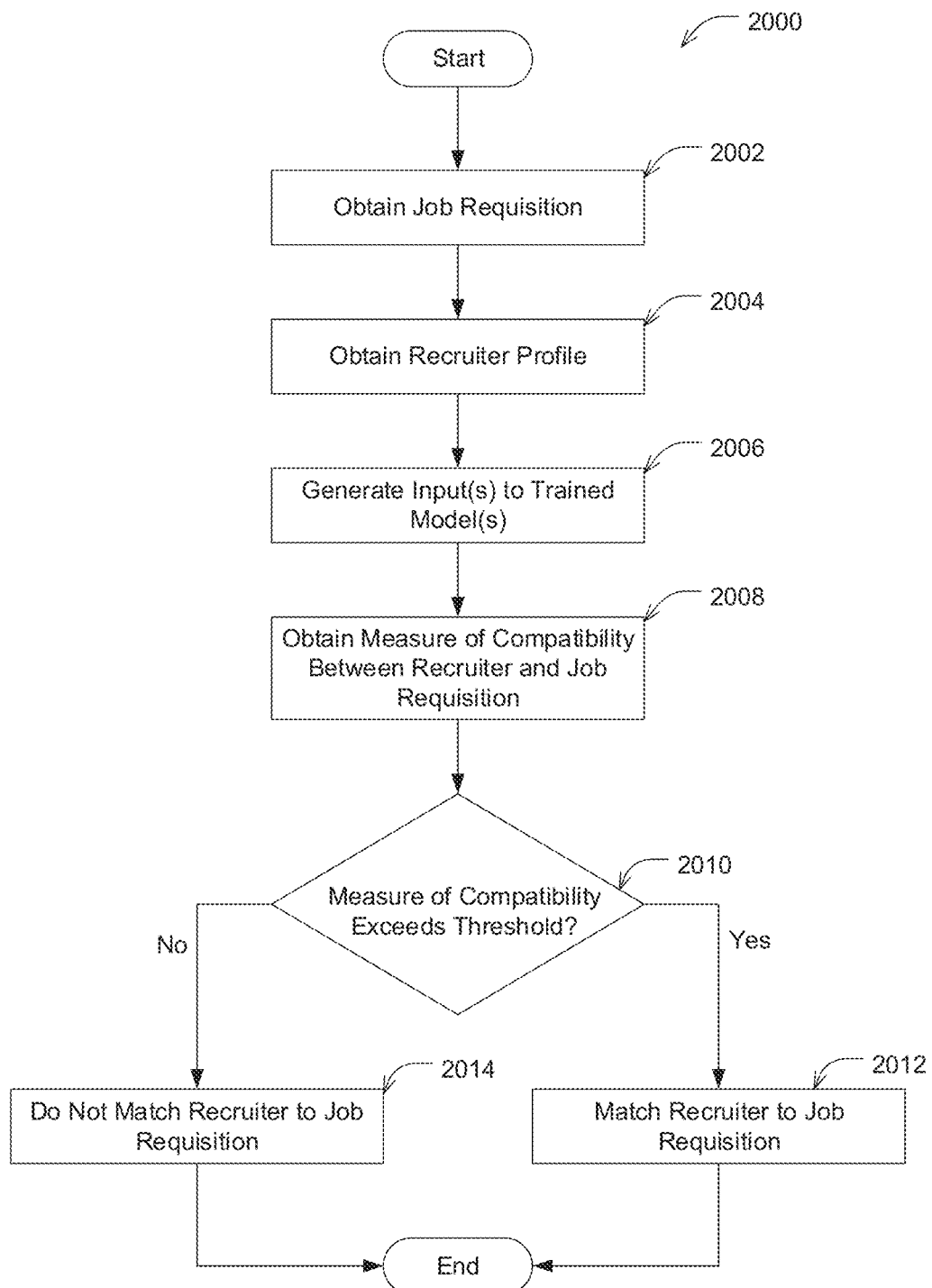
FIG. 20 shows a process of matching a recruiter user to a job requisition using one or more trained models, according to an aspect of the present application.

FIG. 20 shows a process 2000 for matching a recruiter user of the system to a job requisition, according to some embodiments. Process 2000 may be performed by system 1500 described above with reference to FIG. 15.

Process 2000 begins at block 2002 where the system obtains a job requisition. In some embodiments, the system may be configured to retrieve the job requisition from a database of the system. For example, the system may query the database to retrieve a stored record of the job requisition. In some embodiments, the system may be configured to receive the job requisition as an input in response to submission by a hiring party. For example, the system may generate a user interface via which the hiring party may enter the job requisition into the system. Example user interfaces via which the hiring party may enter the job requisition are described herein.

In some embodiments, the system may be configured to retrieve the job requisition from a talent platform of a hiring party. For example, the system may include an API via which the system can communicate with a talent platform separate from the system. The system may use the API to retrieve a job requisition from the talent platform. In some embodiments, the system may be configured to receive the job requisition from the talent platform in response to submission of the job requisition in the talent platform. For example, the system may be configured to receive the job requisition via the API in response to submission in the talent platform.

Next, process 2000 proceeds to block 2004, where the system obtains a recruiter profile associated with a recruiter user. In some embodiments, the system may be configured to retrieve the profile from a database of the system. An example of a profile for a recruiter user is described above with reference to FIG. 16. In some embodiments, the system may be configured to generate the profile. For example, the system may generate the recruiter profile using stored records of activity of the recruiter user.

Next, process 2000 proceeds to block 2006 where the system generates one or more inputs for one or more trained models. For example, the system may generate input(s) for models trained as described above with reference to FIGS. 18 and 19. In some embodiments, the system may be configured to generate an input that includes values of one or more features. For example, the system may be configured to generate values of the feature(s) and generate an array or matrix that stores the values. The array or matrix may be used as input to the model(s).

In some embodiments, the system may be configured to obtain one or more categories of the job requisition using a first set of models. The system may then use the obtained job categories to determine values of one or more features. In some embodiments, the system may use the first set of models to obtain values that are used to generate an input for a second set of models. For example, the job categories of the job requisition may be used by the system to determine input values for the second set of models.

In some embodiments, the system may be configured to determine values of one or more inputs to the model(s) using augmented information. In some embodiments, the system may be configured to obtain the augmented information by identifying specific information specified by a job requisition and/or information about the recruiter user. For example, the system may identify the information from a stored job requisition record and/or a stored recruiter profile. In some embodiments, the system may be configured to obtain additional information based on the identified information from the job requisition or the recruiter user profile. In some embodiments, the system may be configured to identify characteristics of one or more job requisitions that the recruiter user has previously placed candidates for, and obtain additional information based on the identified characteristic(s). The characteristic(s) may include identities of one or more employers that the recruiter user has worked with (e.g., placed candidates and/or submitted candidates to), textual job descriptions of the job requisition(s), job skills specified in the job requisition(s), and/or employment categories of the job requisition(s). The system may be configured to use the characteristics to obtain additional information that is used to augment the input to the model(s). For example, the system may gather additional textual description about the employers that the recruiter has worked with and use it for generating input to the model(s).

Next, process 2000 proceeds to block 2008 where the system obtains a measure of compatibility (e.g., a matching score) between the recruiter user and the job requisition. In some embodiments, the system may be configured to receive the measure of compatibility in response to an input to the model(s). For example, the system may input an array or matrix of feature values and, in response, receiving a matching score. The matching score may indicate a likelihood that the recruiter user will place a suitable candidate for the job requisition.

Next, process 2000 proceeds to block 2010 where the system uses the measure of compatibility to determine whether to match the recruiter user to the job requisition. In some embodiments, the system may be configured to determine whether the measure of compatibility exceeds a threshold. For example, the system may compare an obtained match score to a threshold score.

If, at block 2010, the system determines that the measure of compatibility exceeds a threshold value, then process 2000 proceeds to block 2012 where the system matches the recruiter user to the job requisition. In some embodiments, the system may be configured to match the recruiter user to the job requisition by recommending the recruiter user to a hiring party that submitted the job requisition. For example, the system may transmit a notification to a talent platform (e.g., an ATS) used by the hiring party, and/or generate a notification in a user interface generated by the system for the hiring party. In some embodiments, the system may be configured to match the recruiter to the job requisition by recommending to the recruiter user. For example, the system may transmit a notification to a talent platform used by the recruiter user, and/or generate a notification in a user interface generated by the system for the recruiter user. After block 2012, process 2000 ends.

In some embodiments, the system may be configured to use the measure of compatibility with one or more other factors to determine whether to match the recruiter user to the job requisition. In some embodiments, the system may be configured to determine an indication of how busy the recruiter user is. The system may be configured to determine the indication of how busy the recruiter user is based on the number of job requisitions that the recruiter user is working with in the system. For example, the system may store a record of job requisitions that are active, and which are being handled by the recruiter user. The system may use the stored record as an indication of how busy the recruiter user is. If the system determines that the recruiter user is too busy, then the system may determine to not match the recruiter user to the job requisition.

In some embodiments, the system may be configured to determine whether to match the recruiter to the job requisition based on how urgently a candidate is needed for the job requisition. In some embodiments, the system may be configured to determine a measure of urgency based on a response time of the hiring party associated with the job requisition. For example, a hiring party with a response time less than a threshold value (e.g., 1 hour, 5 hours, 12 hours, 1 day, 1 week), the system may determine that the job requisition requires a high level of urgency. The system may be configured to use the measure of urgency in matching the recruiter user to the job requisition. For example, if the urgency is high, and the recruiter user has poor responsiveness or is too busy, the system may determine to not match the recruiter user to the job requisition.

If, at block 2010, the system determines that the measure compatibility does not exceed the threshold, then process 2000 proceeds to block 2014 where the system does not match the recruiter user to the job requisition. In some embodiments, the system may be configured to prevent the recruiter user from accessing the job requisition in the system or in a talent platform used by the recruiter user. In some embodiments, the system may be configured to prevent a hiring party user that submitted the job requisition from accessing the recruiter user for placement of a candidate for the job requisition in a talent platform used by the hiring party or in the system. After block 2014, process 2000 ends.

Figure 21:
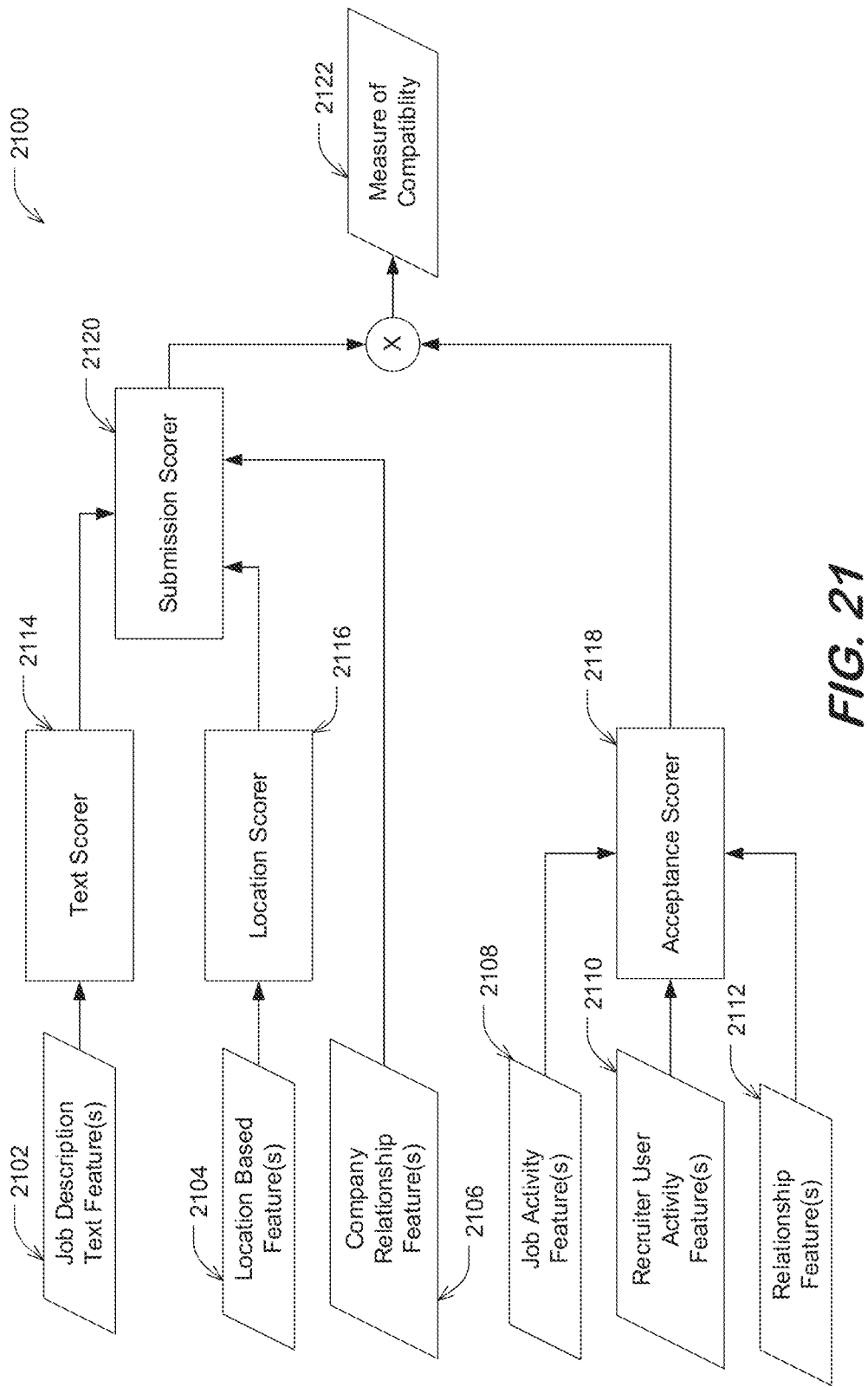
FIG. 21 shows a data flow diagram of a set of models for use in matching a recruiter user to a job requisition, according to an aspect of the present application.

FIG. 21 shows a data flow diagram 2100 of a set of models for use in matching a recruiter user to a job requisition, according to some embodiments of the present application. In some embodiments, the set of models show in block diagram 2100 may be used and/or trained by the talent exchange system 1500 described above with reference to FIG. 15.

The data flow diagram 2100 shows multiple types of input features 2102-2112 which may be used by scoring models 2114-2120 to generate one or more outputs. The outputs of one or more of the scoring models may be used as inputs to other ones of the scoring models. For example, as shown in FIG. 21, the outputs of the text scorer 2114 and the location scorer 2116 may be used as input to the submission scorer 2120. The outputs of different models may be combined to obtain the measure of compatibility. For example, as shown in FIG. 21, the output of the submission scorer 2120, and the acceptance scorer 2118 may be multiplied to obtain the measure of compatibility 2122.

In some embodiments, the system may be configured to generate a representation of textual data of a job requisition. The textual data may include a textual description of a job, a job title, and/or other textual information in the job requisition. For example, the system may be configured to generate a dense vector representation of textual data of the job requisition. The system may be configured to compress and concatenate the textual data into an n-dimensional vector where n is the number of dimensions (e.g., 10, 15, 20, 25, 30) of the vector. In some embodiments, the system may be configured to store the vector representation in the system (e.g., in database 1510).

In some embodiments, the system may be configured to use representations of the textual data for determining values of the job description textual feature(s) 2102. In some embodiments, the system may be configured to determine a representation of textual data of one or more job requisitions that a recruiter user has previously submitted candidates for, and include the representation in job description text feature(s) 2102. For example, the system may be configured to obtain vector representations of a job description for each of the job requisition(s). In another example, the system may be configured to sum vector representations of the job descriptions of the job requisition(s). In some embodiments, the system may be configured to generate a representation of textual data of a job requisition that is to be scored (i.e., for which to measure compatibility with the recruiter user). In some embodiments, the system may be configured to include, in the job description text feature(s) 2102 (1) representation(s) of textual data of the job requisition(s) for which the recruiter user has previously submitted candidate(s), and (2) a representation of textual data of a job requisition that is to be scored.

In the example embodiment of FIG. 21, the job description text feature(s) 2102 may be input into a text scorer 2114.

In some embodiments, the text scorer 2114 may be a model configured to output a score based on the job description text feature(s) 2102. In some embodiments, the model 2114 may be a trained machine learning model. Examples of models are discussed herein. In some embodiments, the text scorer 2114 may be configured to compare (1) a representation of textual data (e.g., a job description) of a job requisition to be scored, to (2) representation(s) of textual data of the job requisition(s) that the recruiter user has previously submitted candidate(s) for. In some embodiments, the system may be configured to determine a measure of distance between the representations. For example, the system may be configured to determine a distance between (1) a vector representation of textual data of the job requisition to be scored, and (2) a sum of vector representations of textual data of the job requisition(s) that the recruiter user has previously submitted candidates to. In another example, the system may be configured to determine an average distance between (1) a vector representation of textual data of the job requisition to be scored, and (2) vector representations of textual data of the previous job requisition(s) that the recruiter has submitted candidates for. In some embodiments, the measure of distance may be a Euclidean distance, element-wise product, or a cosine distance. Some embodiments may use a combination of different measures of distance. Some embodiments are not limited to a particular measure of distance.

In the example embodiment of FIG. 21, the system is configured to use one or more location based features 2104 as input to a location scorer 2116. In some embodiments, the system may be configured to determine values of the location based feature(s) 2104. In some embodiments, the location based feature(s) 2104 may include a location specified by a job requisition to be scored, and location(s) specified by one or more job requisitions that the recruiter user has previously submitted candidates for. For example, the system may be configured to include latitude and longitude values as the location based feature(s) 2104. In another example, the system may be configured to include a city, state, country, zip code, province, or other identification of location in the location based feature(s) 2104.

In the example embodiment of FIG. 21, the location scorer 2116 receives the location based feature(s) 2104 and determines one or more values. In some embodiments, the system may be configured to determine an average distance between the location of the job requisitions to be scored, and location(s) of a set of job requisition(s) that the recruiter user has previously submitted candidates for. For example, the system may determine an average distance from locations of a certain number (e.g., 5, 10, 15, 20, 25, 30, 35, 40, 45, 50) of job requisitions that are closest to the location of the job requisitions to be scored. In some embodiments, the number of job requisitions used in the calculation may be calculated by the system as n/x, where n is the total job requisitions that the recruiter user has submitted candidates for, and x is a constant value (e.g., 2, 3, 4, 5, 6, 7, 8, 9, 10). In some embodiments, the system may be configured to determine the distance of the location of the job requisition to be scored to the nearest job requisition that the recruiter user has previously submitted a candidate.

In some embodiments, the location scorer 2116 may be configured to determine an output using values in addition to, or instead of the distance(s) and/or average distance. For example, the system may be configured to determine values of $2^{nd}$ and $3^{rd}$ order polynomials for each of the distance(s). The values of the $2^{nd}$ or $3^{rd}$ order polynomials may be included in the output generated by the location scorer 2116.

In some embodiments, the system may be configured to obtain one or more company relationship features 2106. For example, the system may be configured to determine values of the company relationship features 2106 based on a stored activity record of the recruiter user. In some embodiments, the company relationship feature(s) 2106 may include a percentage of candidate submissions that went to a hiring party that submitted the job requisition to be scored. In some embodiments, the company relationship feature(s) 2106 may include a binary value indicating whether the recruiter user has every submitted a candidate for the hiring party associated with the job requisition.

In the example embodiment of FIG. 21, the submission scorer 2120 receives output of the text scorer 2114, output of the location scorer 2116, and the company relationship feature(s) 2106. In some embodiments, the submission scorer 2120 may be a model trained to output a submission score. Examples of models are discussed herein. The submission score may output an indicate a likelihood that the recruiter user is to submit a candidate for the job requisition to be scored. For example, the submission score may be a probability that the recruiter user will submit a candidate for the job requisition to be scored.

In the example embodiment of FIG. 21, the acceptance scorer 2118 receives values of one or more (1) job activity features 2108, (2) recruiter user activity features 2110, and (3) relationship features 2112. In some embodiments, the job activity feature(s) 2108 may be an average number of candidates accepted for interview by the hiring party across a set of other job requisitions of the hiring party. In some embodiments, the recruiter user activity features 2110 may be a value based on a percentage of the recruiter user's candidates submissions that have been accepted. For example, the system may be configured to determine a percentage of candidate submissions by the recruiter user for multiple job requisitions, different from the job requisition to be scored, that have been accepted by respective hiring parties. In some embodiments, the system may be configured to adjust an acceptance rate submitted to the acceptance scorer 2118. For example, the system may be configured to use a prior probability of 25% to determine an acceptance rate that is inputted to the acceptance scorer 2118. This may prevent deviations resulting from small data sets from which to calculate an acceptance rate for the recruiter user. In some embodiments, the relationship feature(s) 2112 may include a binary value indicating whether the recruiter user has an exclusivity relationship with the hiring party associated with the job requisition to be scored. In some embodiments, the system may be configured to determine the value based on a stored record of an agreement between the recruiter user and the hiring party. In some embodiments, the system may be configured to determine the value based on a stored record of the recruiter user placing candidates for the hiring party. For example, the system may determine whether the hiring party has worked with the recruiter user for a number of other job requisitions of the hiring party. The system may set the value based on this determination.

In some embodiments, the acceptance scorer 2118 may be a model trained to output a submission score. Examples of models are discussed herein. The acceptance scorer 2118 may output an indication of a likelihood that a candidate submitted by the recruiter user for the job requisition would be accepted by the hiring party associated with the job requisition to be scored. For example, the acceptance score may be a probability that a candidate would be accepted by the hiring party based on the historical record of the recruiter user's activity, and the job requisition.

In some embodiments, the system may be configured to combine the output of the submission scorer 2110 with the output of the acceptance scorer 2118 to obtain the measure of compatibility 2122 of the job requisition and the recruiter user. For example, the system may be configured to multiply the output of the submission scorer 2120 with the output of the acceptance scorer 2118 as illustrated in FIG. 21. In some embodiments, the output of the submission scorer 2120 may be a probability of the recruiter user submitting a candidate for the job requisition, and the output of the acceptance scorer 2118 may be a probability of the hiring party accepting a submission by the recruiter user. The system may be configured to multiply the probability of submission by the probability of acceptance by the hiring party given the submission to obtain a total probability of the recruiter user placing a candidate for the job requisition. In some embodiments, the measure of compatibility 2122 may be an indication of the determined total probability of the recruiter user placing a candidate for the job requisition. For example, the indication may be a percentage or ratio value indicating the probability of acceptance.

In some embodiments, the system may be configured to combine the outputs of the scorers in a mathematical function that outputs a numerical value of the measure of compatibility. Some embodiments are not limited to a particular way of combining the scores.

In some embodiments, the system may be configured to determine values of features described herein for each of multiple categories. For example, the system may be configured to use a first set of models for classifying a job requisition to score into one or more job categories. The system may be configured to determine values of feature(s) for the job categories(s) that the job requisition has been classified into, and use them for determining the measure of compatibility 2122. In some embodiments, the system may be configured to maintain separate scorer models for each job category. The system may be configured to use scorers based on the job categories of the job requisition to be scored. In some embodiments, the system may be configured to determine a value of the measure of compatibility across all job categories, and combine with the value of the measure of compatibility for one or more job categories of the job requisition to obtain the measure of compatibility 2122.

In some embodiments, the system may be configured to store values of one or more of the features discussed herein. For example, the system may be configured to store values in a recruiter profile (e.g., profile 1600) and/or a hiring party profile stored by the system.

Example Computer System

Various aspects and functions described herein may be implemented as specialized hardware or software components executing in one or more specialized computer systems. There are many examples of computer systems that are currently in use that could be specially programmed or specially configured. These examples include, among others, network appliances, personal computers, workstations, mainframes, networked clients, servers, media servers, application servers, database servers, and web servers. Other examples of computer systems may include mobile computing devices (e.g., smart phones, tablet computers, and personal digital assistants) and network equipment (e.g., load balancers, routers, and switches). Examples of particular models of mobile computing devices include iPhones, iPads, and iPod Touches running iOS operating systems available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

Figure 22:
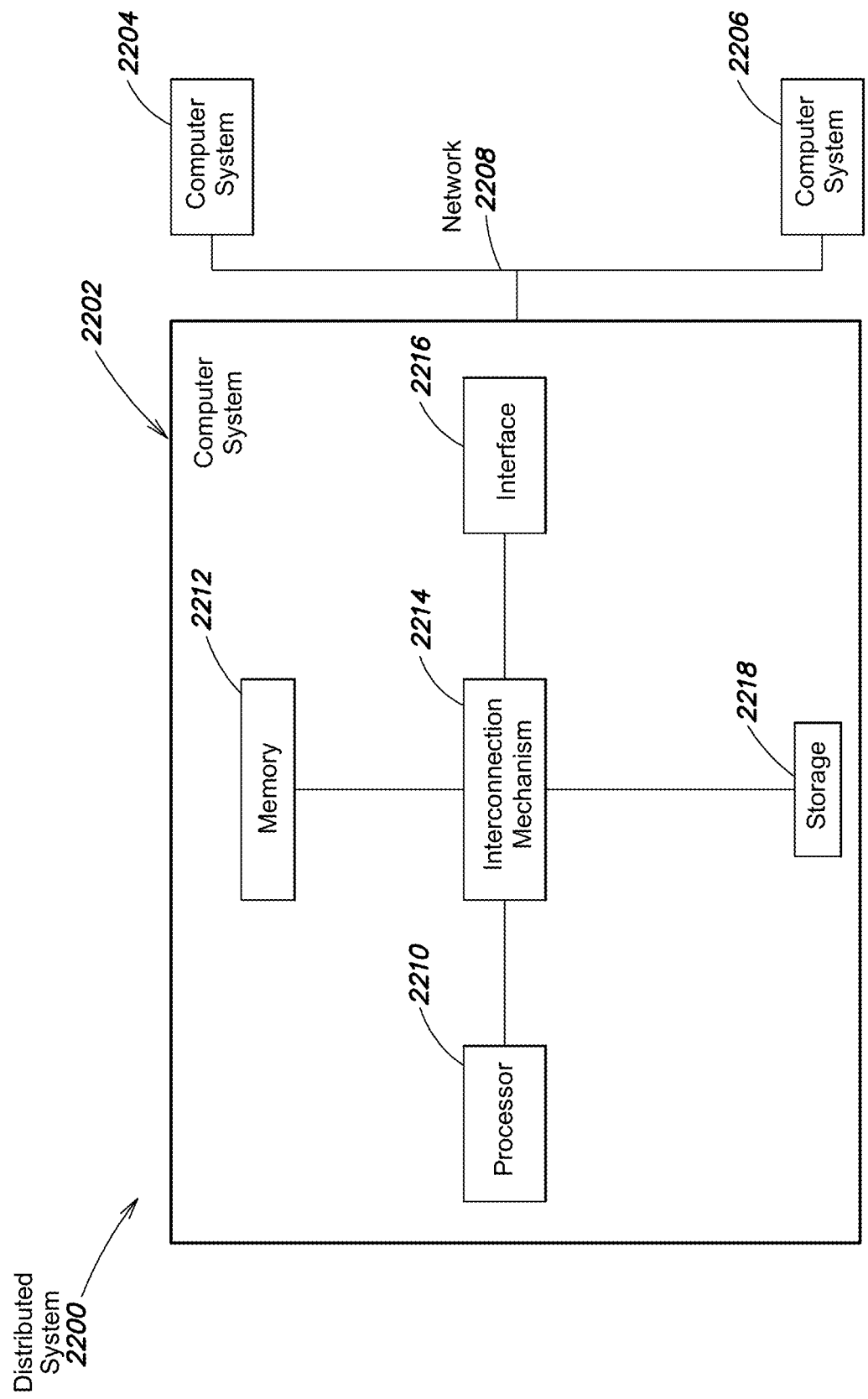
FIG. 22 shows an example distributed computer system in which various aspects of the present application may be implemented.

For example, various aspects, functions, and processes may be distributed among one or more computer systems configured to provide a service to one or more client computers, or to perform an overall task as part of a distributed system, such as the distributed computer system 2200 shown in FIG. 22. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Referring to FIG. 22, there is illustrated a block diagram of a distributed computer system 2200, in which various aspects and functions are practiced. As shown, the distributed computer system 2200 includes one or more computer systems that exchange information. More specifically, the distributed computer system 2200 includes computer systems 2202, 2204, and 2206. As shown, the computer systems 2202, 2204, and 2206 are interconnected by, and may exchange data through, a communication network 2208. The network 2208 may include any communication network through which computer systems may exchange data. To exchange data using the network 2208, the computer systems 2202, 2204, and 2206 and the network 2208 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS22, JSON, SOAP, CORBA, REST, and Web Services. To ensure data transfer is secure, the computer systems 2202, 2204, and 2206 may transmit data via the network 2208 using a variety of security measures including, for example, SSL or VPN technologies. While the distributed computer system 2200 illustrates three networked computer systems, the distributed computer system 2200 is not so limited and may include any number of computer systems and computing devices, networked using any medium and communication protocol.

As illustrated in FIG. 22, the computer system 2202 includes a processor 2210, a memory 2212, an interconnection element 2214, an interface 2216 and data storage element 2218. To implement at least some of the aspects, functions, and processes disclosed herein, the processor 2210 performs a series of instructions that result in manipulated data. The processor 2210 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 2210 is connected to other system components, including one or more memory devices 2212, by the interconnection element 2214.

The memory 2212 stores programs (e.g., sequences of instructions coded to be executable by the processor 2210)

and data during operation of the computer system 2202. Thus, the memory 2212 may be a relatively high performance, volatile, random access memory such as a dynamic random access memory ("DRAM") or static memory ("SRAM"). However, the memory 2212 may include any device for storing data, such as a disk drive or other nonvolatile storage device. Various examples may organize the memory 2212 into particularized and, in some cases, unique structures to perform the functions disclosed herein. These data structures may be sized and organized to store values for particular data and types of data.

Components of the computer system 2202 are coupled by an interconnection element such as the interconnection element 2214. The interconnection element 2214 may include any communication coupling between system components such as one or more physical busses in conformance with specialized or standard computing bus technologies such as IDE, SCSI, PCI and InfiniBand. The interconnection element 2214 enables communications, including instructions and data, to be exchanged between system components of the computer system 2202.

The computer system 2202 also includes one or more interface devices 2216 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 2202 to exchange information and to communicate with external entities, such as users and other systems.

The data storage element 2218 includes a computer readable and writeable nonvolatile, or non-transitory, data storage medium in which instructions are stored that define a program or other object that is executed by the processor 2210. The data storage element 2218 also may include information that is recorded, on or in, the medium, and that is processed by the processor 2210 during execution of the program. More specifically, the information may be stored in one or more data structures specifically configured to conserve storage space or increase data exchange performance. The instructions may be persistently stored as encoded signals, and the instructions may cause the processor 2210 to perform any of the functions described herein. The medium may, for example, be optical disk, magnetic disk or flash memory, among others. In operation, the processor 2210 or some other controller causes data to be read from the nonvolatile recording medium into another memory, such as the memory 2212, that allows for faster access to the information by the processor 2210 than does the storage medium included in the data storage element 2218. The memory may be located in the data storage element 2218 or in the memory 2212, however, the processor 2210 manipulates the data within the memory, and then copies the data to the storage medium associated with the data storage element 2218 after processing is completed. A variety of components may manage data movement between the storage medium and other memory elements and examples are not limited to particular data management components. Further, examples are not limited to a particular memory system or data storage system.

Although the computer system 2202 is shown by way of example as one type of computer system upon which various aspects and functions may be practiced, aspects and functions are not limited to being implemented on the computer system 2202 as shown in FIG. 22. Various aspects and functions may be practiced on one or more computers having a different architectures or components than that shown in FIG. 22. For instance, the computer system 2202 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 2202 may be a computer system including an operating system that manages at least a portion of the hardware elements included in the computer system 2202. In some examples, a processor or controller, such as the processor 2210, executes an operating system. Examples of a particular operating system that may be executed include a Windows-based operating system, such as, the Windows-based operating systems, available from the Microsoft Corporation, a MAC OS System X operating system or an iOS operating system available from Apple Computer, one of many Linux-based operating system distributions, for example, the Enterprise Linux operating system available from Red Hat Inc., or a UNIX operating system available from various sources. Many other operating systems may be used, and examples are not limited to any particular operating system.

The processor 2210 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, Java, C++, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture.

It is to be appreciated that embodiments of the methods and apparatuses described herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features described in connection with any one or more embodiments are not intended to be excluded from a similar role in any other embodiments.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method comprising:
    tracking, by at least one processor, activity of a plurality of recruiter users of a talent exchange system, the activity comprising actions performed in the talent exchange system by the plurality of recruiter users in placing candidates for job requisitions;
    storing, by the at least one processor, in a database, records of the activity of the plurality of recruiter users;
    training at least one first machine learning model, by the at least one processor, using at least a first portion of the records of the activity of the plurality of recruiter users and information in one or more job requisitions for which the plurality of recruiter users have placed candidates, the at least one first machine learning model comprising at least one neural network, wherein training the at least one first machine learning model comprises iteratively training the at least one neural network using back propagation, based on feedback of predicted value of the at least one neural network, and wherein the at least one first machine learning model is configured to output a plurality of numerical values using a job requisition, wherein the plurality of numerical values are each associated with a respective one of a set of job categories;
    training at least one second machine learning model, by the at least one processor, using at least a second portion of the records of the activity of the plurality of recruiter users, the second portion of the records of the activity associated with one or more job requisitions for which the plurality of recruiter users have placed candidates, the at least one second machine learning model configured to output a measure of compatibility between a recruiter user and a job requisition;
    obtaining at least one job category associated with a first job requisition using the trained at least one first machine learning model configured to be provided with the first job requisition and output a plurality of output numerical values using the first job requisition, each output numerical value associated with a respective one of the set of job categories, wherein obtaining the at least one job category is based on the plurality of output numerical values outputted by the trained at least one first machine learning model;
    determining, by the at least one processor, a portion of a record of activity of a first recruiter user associated with the at least one job category;
    obtaining, by the at least one processor, a first measure of compatibility associated with the at least one job category between the first recruiter user and the first job requisition from the trained at least one second machine learning model, wherein the trained at least one second machine learning model is provided with at least the portion of the record of activity of the first recruiter associated with the at least one job category and the first job requisition to output the first measure of compatibility;
    determining whether the first measure of compatibility between the first recruiter user and the first job requisition exceeds a threshold;
    in response to determining that the first measure of compatibility between the first recruiter user and the first job requisition exceeds the threshold, performing one or more operations comprising:
        recommending, within a user interface of a talent platform associated with a hiring user that submitted the first job requisition, the first recruiter user in the at least one job category to the hiring user that submitted the first job requisition; or
        recommending, within a user interface of a talent platform associated with a first recruiter user, the first job requisition to the first recruiter user; and
    matching a candidate submitted by the first recruiter user to the first job requisition based on the first measure of compatibility, wherein the first measure of compatibility comprises a numerical score indicative of a likelihood that the first recruiter user will place a suitable candidate for the first job requisition.

2. The computer-implemented method of claim 1, further comprising:
    storing, by the at least one processor, the record of activity of the first recruiter user in the database;
    generating, by the at least one processor, a profile of the first recruiter user based on the record of activity of the first recruiter user; and
    matching, by the at least one processor, the first recruiter user to the first job requisition using the profile of the first recruiter user.

3. The computer-implemented method of claim 2, wherein matching the first recruiter user to the first job requisition using the profile of the first recruiter user comprises generating an input to the trained at least one second machine learning model using information from the profile of the first recruiter user.

4. The computer-implemented method of claim 2, wherein generating the profile of the first recruiter user based on the record of activity of the first recruiter comprises:
  determining a value of a measure of performance for the first recruiter user in placing candidates for a job category; and
  storing the value of the measure of performance mapped to an identification of the job category in the profile.

5. The computer-implemented method of claim 1, further comprising:
  identifying, by the at least one processor, one or more characteristics of one or more job requisitions that the first recruiter user has previously worked on;
  obtaining, by the at least one processor, additional information using the identified one or more characteristics; and
  generating, by the at least one processor, an input to the trained at least one second machine learning model based on the obtained additional information.

6. The computer-implemented method of claim 5, wherein the one or more characteristics include identities of one or more employers that the first recruiter user has worked with, textual job descriptions of the one or more job requisitions, job skills specified in the one or more job requisitions, and/or employment categories of the one or more job requisitions.

7. The computer-implemented method of claim 1, further comprising generating, by the at least one processor, an input to the trained at least one second machine learning model based on values of one or more measures of performance for the first recruiter user.

8. The computer-implemented method of claim 7, wherein the one or more measures of performance include a submission acceptance rate, hiring rate, response time, number of hires, time taken to hire for one or more job requisitions for which the first recruiter user has placed candidates, and/or experience level specified by the one or more job requisitions.

9. The computer-implemented method of claim 1, further comprising generating, by the at least one processor, an input to the trained at least one second machine learning model based on whether the first recruiter user has a prior relationship with a hiring party that submitted the first job requisition.

10. The computer-implemented method of claim 1, wherein matching the first recruiter user to the first job requisition is based at least in part on a measure of urgency for finding a candidate for the first job requisition.

11. The computer-implemented method of claim 10, further comprising determining, by the at least one processor, a value of the measure of urgency based on a response time of a hiring party associated with the first job requisition.

12. The computer-implemented method of claim 1, further comprising generating, by the at least one processor, an input to the trained at least one second machine learning model using information specified by the first job requisition.

13. The computer-implemented method of claim 12, wherein the information specified by the first job requisition includes an indication of a location, an employer name, an indication of salary, a placement fee, a job title, an indication of a level of responsibility, a number of employees that are to report to the position, a size of an employer, and/or representation of a textual job description.

14. The computer-implemented method of claim 1, further comprising determining, by the trained at least one second machine learning model, the first measure of compatibility between the first recruiter user and the first job requisition based on performance of the first recruiter user in placing candidates for each of one or more additional job categories associated with the first job requisition.

15. The computer-implemented method of claim 1, further comprising:
  classifying, using the trained at least first machine learning model, the first job requisition into one or more additional job categories; and
  determining, by the at least one machine learning model, the first measure of compatibility based on the one or more additional job categories that the first job requisition is classified into.

16. The computer-implemented method of claim 1, wherein the trained at least first machine learning model is configured to process textual information in the first job requisition.

17. The computer-implemented method of claim 16, wherein the trained at least first machine learning model comprises a transformer.

18. The computer-implemented method of claim 16, wherein the trained at least first machine learning model comprises a recursive neural network.

19. The computer-implemented method of claim 1, wherein the first measure of compatibility comprises an indication of a probability that the first recruiter user will place a candidate for the first job requisition.

20. The computer-implemented method of claim 18, wherein training the at least one first machine learning model comprises training the recursive neural network.

21. The computer-implemented method of claim 1, further comprising matching, by the at least one processor, a candidate submitted by the first recruiter user to the first job requisition based on the first measure of compatibility.

22. The computer-implemented method of claim 21, further comprising determining, by the at least one processor, the first measure of compatibility between the first recruiter user and the first job requisition at least in part by determining a compatibility score between the first recruiter user and an employer that submitted the first job requisition.

23. The computer-implemented method of claim 1, further comprising matching, by the at least one processor, a second recruiter user of the plurality of recruiter users to the first job requisition at least in part using a second measure of compatibility between the second recruiter user and the first job requisition.

24. The computer-implemented method of claim 1, wherein training the at least one first machine learning model comprises training a trained statistical classifier (TSC) to receive, as an input, the first job requisition and to provide, as an output, the one or more job categories.

25. The computer-implemented method of claim 1, wherein recommending the first recruiter user to the hiring user comprises, by the at least one processor, transmitting a notification in the user interface of the talent platform associated with the hiring user that submitted the first job requisition.

26. The computer-implemented method of claim 1, wherein recommending the first job requisition to the first recruiter user comprises transmitting a notification in the user interface of the talent platform associated with the first recruiter user.

27. The computer-implemented method of claim 1, wherein matching the first recruiter user to the first job requisition is based at least in part on an indication of how busy the first recruiter user is with active job requisitions.

28. The computer-implemented method of claim 27, further comprising determining, by the at least one processor, the indication of how busy the first recruiter is based on a number of active job requisitions, different from the first job requisition, that the first recruiter user is assigned to in the system.

29. At least one non-transitory computer-readable storage medium storing processor-executable instructions that, when executed by at least one first processor, cause the at least one first processor to perform operations comprising:
tracking activity of a plurality of recruiter users of a talent exchange system, the activity comprising actions performed in the talent exchange system by the plurality of recruiter users in placing candidates for job requisitions;
storing records of the activity of the plurality of recruiter users;
training at least one first machine learning model using at least a first portion of the records of the activity of the plurality of recruiter users and information in one or more job requisitions for which the plurality of recruiter users have placed candidates, the at least one first machine learning model comprising at least one neural network, wherein training the at least one first machine learning model comprises iteratively training the at least one neural network using back propagation, based on feedback of predicted value of the at least one neural network, and wherein the at least one first machine learning model is configured to output a plurality of numerical values using a job requisition, wherein the plurality of numerical values are each associated with a respective one of a set of job categories;
training at least one second machine learning model using at least a second portion of the records of the activity of the plurality of recruiter users, the second portion of the records of the activity associated with one or more job requisitions for which the plurality of recruiter users have placed candidates, the at least one second machine learning model configured to output a measure of compatibility between a recruiter user and a job requisition;
obtaining at least one job category associated with a first job requisition using the trained at least one first machine learning model configured to be provided with the first job requisition and output a plurality of output numerical values using the first job requisition, each output numerical value associated with a respective one of the set of job categories, wherein obtaining the at least one job category is based on the plurality of output numerical values outputted by the trained at least one first machine learning model;
determining a portion of a record of activity of a first recruiter user associated with the at least one job category;
obtaining a first measure of compatibility associated with the at least one job category between the first recruiter user and the first job requisition from the trained at least one second machine learning model, wherein the trained at least one second machine learning model is provided with at least the portion of the record of activity of the first recruiter associated with the at least one job category and the first job requisition to output the first measure of compatibility; and
matching a candidate submitted by the first recruiter user to the first job requisition based on the first measure of compatibility, wherein the first measure of compatibility comprises a numerical score indicative of a likelihood that the first recruiter user will place a suitable candidate for the first job requisition.

30. A system, comprising:
a database; and
at least one processor configured to:
track activity of a plurality of recruiter users of a talent exchange system, the activity comprising actions performed in the talent exchange system by the plurality of recruiter users in placing candidates for job requisitions;
store, in the database, records of the activity of the plurality of recruiter users;
train at least one first machine learning model, by the at least one processor, using at least a first portion of the records of the activity of the plurality of recruiter users and information in one or more job requisitions for which the plurality of recruiter users have placed candidates, the at least one first machine learning model comprising at least one neural network, wherein training the at least one first machine learning model comprises iteratively training the at least one neural network using back propagation, based on feedback of predicted value of the at least one neural network, and wherein the at least one first machine learning model is configured to output a plurality of numerical values using a job requisition, wherein the plurality of numerical values are each associated with a respective one of a set of job categories;
train at least one second machine learning model, using at least a second portion of the records of the activity of the plurality of recruiter users, the second portion of the records of the activity associated with one or more job requisitions for which the plurality of recruiter users have placed candidates, the at least one second machine learning model configured to output a measure of compatibility between a recruiter user and a job requisition;
obtain at least one job category associated with a first job requisition using the trained at least one first machine learning model configured to be provided with the first job requisition and output a plurality of output numerical values using the first job requisition, each output numerical value associated with a respective one of the set of job categories, wherein obtaining the at least one job category is based on the plurality of output numerical values outputted by the trained at least one first machine learning model;
determine, by the at least one processor, a portion of a record of activity of a first recruiter user associated with the at least one job category;
obtain a first measure of compatibility associated with the at least one job category between the first recruiter user and the first job requisition from the trained at least one second machine learning model, wherein the trained at least one second machine learning model is provided with at least the portion of the record of activity of the first recruiter associated with the at least one job category and the first job requisition to output the first measure of compatibility;
determine whether the first measure of compatibility between the first recruiter user and the first job requisition exceeds a threshold;
in response to determining that the first measure of compatibility between the first recruiter user and the first job requisition exceeds the threshold, perform one or more operations comprising:

recommending, within a user interface of a talent platform associated with a hiring user that submitted the first job requisition, the first recruiter user in the at least one job category to the hiring user that submitted the first job requisition; or recommending, within a user interface of a talent platform associated with a first recruiter user, the first job requisition to the first recruiter user and match a candidate submitted by the first recruiter user to the first job requisition based on the first measure of compatibility, wherein the first measure of compatibility comprises a numerical score indicative of a likelihood that the first recruiter user will place a suitable candidate for the first job requisition.

31. A computer-implemented method comprising:

tracking, by at least one processor, activity of a plurality of recruiter users of a talent exchange system, the activity comprising actions performed in the talent exchange system by the plurality of recruiter users in placing candidates for job requisitions;

storing, by the at least one processor, in a database, records of the activity of the plurality of recruiter users;

training at least one first machine learning model, by the at least one processor, using at least a first portion of the records of the activity of the plurality of recruiter users and information in one or more job requisitions for which the plurality of recruiter users have placed candidates, the at least one first machine learning model comprising at least one neural network, wherein training the at least one first machine learning model comprises iteratively training the at least one neural network using back propagation, based on feedback of predicted value of the at least one neural network, and wherein the at least one first machine learning model is configured to output a plurality of numerical values using a job requisition, wherein the plurality of numerical values are each associated with a respective one of a set of job categories;

training at least one second machine learning model, by the at least one processor, using at least a second portion of the records of the activity of the plurality of recruiter users, the second portion of the records of the activity associated with one or more job requisitions for which the plurality of recruiter users have placed candidates, the at least one second machine learning model configured to output measures of compatibility between at least one recruiter user and at least one job requisition;

obtaining a job category at least in part based on the at least one job requisition using the trained at least one machine learning model configured to be provided with the first job requisition and output a plurality of output numerical values using the first job requisition, each output numerical value associated with a respective one of the set of job categories, wherein obtaining the at least one job category is based on the plurality of output numerical values outputted by the trained at least one first machine learning model;

determining, by the at least one processor, a portion of records of activity of a first recruiter user associated with the at least one job category;

obtaining, by the at least one processor, at least one measure of compatibility associated with the job category between the at least one recruiter user and the at least one job requisition from the trained at least one second machine learning model to recommend, within a user interface of a talent platform associated with at least one hiring user that submitted the at least one job requisition, the at least one recruiter user in the job category to the at least one hiring user that submitted the at least one job requisition; and matching, by the at least one processor, a candidate submitted by the at least one recruiter user in response to the at least one job requisition based on the at least one measure of compatibility, wherein the at least one measure of compatibility comprises a numerical score indicative of a likelihood that the at least one recruiter user will place a suitable candidate for the at least one job requisition.

32. The computer-implemented method of claim 31, further comprising recommending the at least one job requisition to the at least one recruiter user.

33. The computer-implemented method of claim 31, wherein recommending the at least one recruiter user in the job category to the at least one hiring user that submitted the at least one job requisition comprises transmitting a notification in the user interface of the talent platform associated with the at least one hiring user.

34. The computer-implemented method of claim 31, further comprising:

storing, by the at least one processor, the record of activity of the first recruiter user in the database; and generating, by the at least one processor, a profile of the first recruiter user based on the record of activity of the first recruiter user;

wherein obtaining the first measure of compatibility between the first recruiter user and the first job requisition from the trained at least one second machine learning model comprises generating an input to the trained at least one second machine learning model using information from the profile of the first recruiter user; and wherein the profile of the first recruiter comprises a value of a measure of performance for the first recruiter in placing candidates for the at least one job category.

* * * * *